(12) United States Patent
Choi et al.

(10) Patent No.: US 11,197,337 B2
(45) Date of Patent: Dec. 7, 2021

(54) APPARATUS AND METHOD FOR MANAGING STATE OF TERMINAL IN WIRELESS COMMUNICATION SYSTEM

(71) Applicant: SAMSUNG ELECTRONICS CO., LTD., Suwon-si (KR)

(72) Inventors: Kwangjin Choi, Suwon-si (KR); Dongsook Kim, Suwon-si (KR); Hanseok Kim, Suwon-si (KR); Hwajin Cha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 27 days.

(21) Appl. No.: 16/244,709

(22) Filed: Jan. 10, 2019

(65) Prior Publication Data
US 2019/0215890 A1    Jul. 11, 2019

(30) Foreign Application Priority Data

Jan. 10, 2018    (KR) .................. 10-2018-0003588

(51) Int. Cl.
*H04W 76/27* (2018.01)
*H04W 76/38* (2018.01)
(Continued)

(52) U.S. Cl.
CPC ............ *H04W 76/27* (2018.02); *H04W 8/24* (2013.01); *H04W 76/11* (2018.02); *H04W 76/20* (2018.02);
(Continued)

(58) Field of Classification Search
CPC ... H04W 8/24; H04W 74/0833; H04W 76/11; H04W 76/20; H04W 76/27; H04W 76/38; H04W 72/12
See application file for complete search history.

(56) References Cited

U.S. PATENT DOCUMENTS

2013/0242730 A1* 9/2013 Pelletier ............ H04W 28/0284
                                                              370/230
2014/0056243 A1* 2/2014 Pelletier ............ H04W 72/1268
                                                              370/329
(Continued)

FOREIGN PATENT DOCUMENTS

CA    2 589 373 A1    11/2007
EP    2922336 A1    9/2015
(Continued)

OTHER PUBLICATIONS

Search Report dated Jun. 5, 2019 by the European Patent Office in counterpart European Patent Application No. 19151123.7.

*Primary Examiner* — Asad M Nawaz
*Assistant Examiner* — Kai Chang
(74) *Attorney, Agent, or Firm* — Sughrue Mion, PLLC

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). An apparatus and an operation method of a base station in a wireless communication system are provided. The method may include performing data communication with a terminal that is in a first sub-state of a radio connection state, and controlling to change the state of the terminal from the first sub-state to a second sub-state of the radio connection state on the basis of whether data related to the terminal is generated during a transfer duration. Here, the first sub-state is a state in which resources for terminal context information related to the data communication are allocated in a first layer and a second layer, and the second sub-state is a state in which the resource is allocated in the first layer and is released in the second layer.

16 Claims, 14 Drawing Sheets

(51) Int. Cl.
  *H04W 8/24* (2009.01)
  *H04W 76/11* (2018.01)
  *H04W 76/20* (2018.01)
  *H04W 74/08* (2009.01)
(52) U.S. Cl.
  CPC ........ *H04W 76/38* (2018.02); *H04W 74/0833* (2013.01)

(56) References Cited

U.S. PATENT DOCUMENTS

| | | | | |
|---|---|---|---|---|
| 2016/0065343 | A1* | 3/2016 | Kim | H04L 5/0035 370/329 |
| 2016/0066241 | A1* | 3/2016 | Wu | H04W 36/28 370/331 |
| 2016/0353514 | A1* | 12/2016 | Hapsari | H04W 72/04 |
| 2017/0063595 | A1* | 3/2017 | Ma | H04L 29/08 |
| 2017/0111932 | A1* | 4/2017 | Uemura | H04L 5/0048 |
| 2017/0117956 | A1* | 4/2017 | Lee | H04B 7/2615 |
| 2017/0311278 | A1* | 10/2017 | Adjakple | H04W 68/005 |
| 2018/0020418 | A1* | 1/2018 | Chandramouli | H04W 76/16 |
| 2018/0279275 | A1* | 9/2018 | Chen | H04W 76/14 |
| 2018/0352601 | A1* | 12/2018 | Park | H04W 76/19 |
| 2019/0059124 | A1* | 2/2019 | Wu | H04W 28/065 |
| 2019/0124181 | A1* | 4/2019 | Park | H04W 76/27 |
| 2019/0174571 | A1* | 6/2019 | Deenoo | H04W 76/11 |
| 2019/0182799 | A1* | 6/2019 | Lee | H04W 76/20 |
| 2019/0223075 | A1* | 7/2019 | Jin | H04W 8/24 |
| 2019/0223187 | A1* | 7/2019 | Davydov | H04B 7/0626 |
| 2019/0254086 | A1* | 8/2019 | Tang | H04W 72/04 |
| 2019/0342804 | A1* | 11/2019 | Futaki | H04W 36/14 |
| 2019/0349883 | A1* | 11/2019 | Fujishiro | H04W 76/28 |
| 2020/0029326 | A1* | 1/2020 | Wang | H04W 56/0045 |
| 2020/0196234 | A1* | 6/2020 | Turtinen | H04W 52/0274 |

FOREIGN PATENT DOCUMENTS

| | | |
|---|---|---|
| KR | 10-2015-0092264 A | 8/2015 |
| WO | 2017/196246 A2 | 11/2017 |

* cited by examiner

APPARATUS AND METHOD FOR MANAGING STATE OF TERMINAL IN WIRELESS COMMUNICATION SYSTEM

CROSS-REFERENCE TO RELATED APPLICATION(S)

This application is based on and claims priority under 35 U.S.C. § 119 to Korean Patent Application No. 10-2018-0003588, filed on Jan. 10, 2018, in the Korean Intellectual Property Office, the disclosure of which is incorporated by reference herein in its entirety.

BACKGROUND

1. Field

The disclosure relates to a wireless communication system and, more particularly, to a method and apparatus for managing the state of a terminal in a wireless communication system.

2. Description of Related Art

To meet the demand for wireless data traffic, which has increased since the deployment of $4^{th}$ generation (4G) communication systems, efforts have been made to develop an improved $5^{th}$ generation (5G) or pre-5G communication system. As such, the 5G or pre-5G communication system is also called a "Beyond 4G Network" or a "Post LTE System."

The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), Full Dimensional MIMO (FD-MIMO), array antenna, analog beam forming, and large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a wireless communication system, the state of a terminal may include a radio resource control (RRC) connected state (RRC_CONNECTED), and a RRC connection released or RRC idle state (RRC_IDLE). The RRC_CONNECTED state may be the state in which a terminal is capable of performing data transmission and reception with a base station. The RRC_IDLE state is a state in which a terminal is incapable of performing data transmission and reception with a base station, and the state of the terminal needs to be changed to the RRC_CONNECTED state in order to perform data communication between the terminal and the base station. In order to perform effective data communication with a terminal, a base station needs to manage the state of the terminal.

SUMMARY

Provided are a method and apparatus for effectively managing the state of a terminal in a wireless communication system, a method and apparatus for dynamically allocating resources for context information of a terminal in some of radio protocol layers in a wireless communication system, a method and apparatus for changing the sub-state of a terminal depending on whether data related to the terminal is generated in a wireless communication system, and/or a method and apparatus for triggering a sub-state transfer of a terminal in a wireless communication system.

Additional aspects will be set forth in part in the description which follows and, in part, will be apparent from the description, or may be learned by practice of the presented embodiments.

In accordance with an aspect of the disclosure, an operation method of a base station in a wireless communication system may include performing data communication with a terminal that is in a first sub-state of a radio connection state, and changing the state of the terminal from the first sub-state to a second sub-state of the radio connection state on the basis of whether data related to the terminal is generated during a transfer duration. Here, the first sub-state is a state in which resources for terminal context information related to the data communication are allocated in a first layer and a second layer, and the second sub-state is a state in which the resource is allocated in the first layer and is released in the second layer.

In accordance with an aspect of the present disclosure, an apparatus of a base station in a wireless communication system may include a communication unit configured to perform data communication with a terminal in a first sub-state of a radio connection state, and a controller configured to change the state of the terminal from the first sub-state to a second sub-state of the radio connection state on the basis of whether data related to the terminal is generated during a transfer duration. Here, the first sub-state is a state in which resources for terminal context information related to the data communication are allocated in a first layer and a second layer, and the second sub-state is a state in which the resource is allocated in the first layer, and is released in the second layer.

In accordance with an aspect of the present disclosure, a non-transitory computer-readable recording medium having recorded thereon a program for performing a method in a computer, wherein the method may include performing data communication with a terminal that is in a first sub-state of a radio connection state, and changing the state of the terminal from the first sub-state to a second sub-state of the radio connection state on the basis of whether data related to the terminal is generated during a transfer duration. Here, the first sub-state is a state in which resources for terminal context information related to the data communication are allocated in a first layer and a second layer, and the second sub-state is a state in which the resource is allocated in the first layer and is released in the second layer.

In accordance with an aspect of the present disclosure, an apparatus for a wireless communication system may include a memory storing instructions, and at least one processor configured to execute the instructions to determine to change a state of a terminal, distinct from the apparatus, between a first sub-state of a radio connection state to a second sub-state of the radio connection state, based on whether data related to the terminal is obtained during at least one predetermined duration. Here, the first sub-state is a state in which a resource for context information of the terminal related to the data communication is allocated in a first layer and is allocated in a second layer, and the second sub-state is a state in which the resource is allocated in the first layer, and is released in the second layer.

A method and apparatus according to various embodiments of the present disclosure dynamically allocates a resource for terminal context information in at least one of a packet data convergence protocol (PDCP) layer, a radio link control (RLC) layer, and a media access control (MAC) layer, depending on whether data related to a terminal being in a radio connection state is generated, whereby a base station increases the maximum number of radio-connected terminals that the base station is capable of managing in a radio resource control (RRC) layer, and hardware resources may be efficiently used.

Effects which can be acquired by the present disclosure are not limited to the above described effects, and other effects that have not been mentioned may be clearly understood by those skilled in the art from the following description.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The terms used in the present disclosure are only used to describe specific embodiments, and are not intended to limit the present disclosure. A singular expression may include a plural expression unless plainly different according to a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments.

The expressions "A and/or B," "A or B," "at least one of A and B," "at least one of A or B," "one or more of A and B," and "one or more of A or B," as used herein, may include all possible combinations of the items that are enumerated together. For example, the term "A and/or B" or "at least one of A and B" may designate (1) at least one A, (2) at least one B, or (3) both of at least one A and at least one B.

Hereinafter, various embodiments will be described based on hardware implementations. However, various embodiments include a technology that uses both hardware and software and thus, various embodiments may not exclude software implementations.

The present disclosure relates to a method and apparatus for managing the state of a terminal in a wireless communication system. Particularly, the present disclosure describes a technology for managing the radio resource control (RRC) state of a terminal and the sub-state of the RRC state in a wireless communication system.

Hereinafter, the terms indicating a signal used, the terms indicating control information, the terms indicating network entities, the terms indicating elements of an apparatus, and the like are used for ease of description. Accordingly, the present disclosure is not limited to the following terms, and other terms having the same or similar technical meaning may be used.

Also, although the present disclosure provides various embodiments using terms mentioned in some communication standards (e.g., $3^{rd}$ generation partnership project (3GPP)), the terms are merely used for the purpose of description. Various embodiments may be easily modified and applied to other communication systems.

Figure 1:
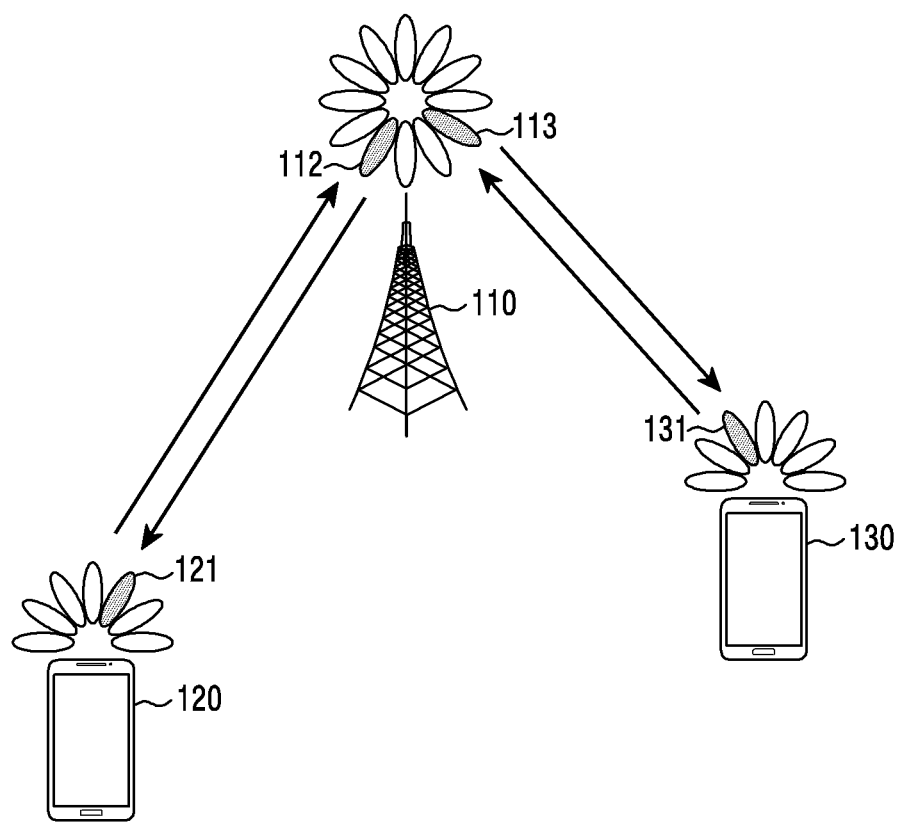
FIG. 1 is a diagram illustrating a wireless communication system according to an embodiment.

FIG. 1 is a diagram illustrating a wireless communication system according to an embodiment. FIG. 1 illustrates a base station 110, a terminal 120, and a terminal 130 as some of nodes that use a wireless channel in a wireless communication system. Although a single base station is illustrated in FIG. 1, another base station that is the same as, or different from, the base station 110 may be further included.

The base station 110 may be a network infrastructure that provides radio access to the terminals 120 and 130. The base station 110 may have coverage defined by a predetermined geographic area based on a distance to which the base station 110 is capable of transmitting a signal. The base station 110 may be referred to as "access point (AP)," "eNodeB (eNB)," "gNodeB (gNB)," "$5^{th}$ generation node (5G node)," "wireless point," "transmission/reception point (TRP)," or other terms having equivalent technical meaning, in addition to "base station."

Each of the terminal 120 and the terminal 130 is a device used by a user, and may perform communication with the base station 110 via a wireless channel. Depending on the case, at least one of the terminals 120 and 130 may operate irrespective of handling by a user. That is, at least one of the terminal 120 and the terminal 130 may be a device that performs machine type communication (MTC), and may not be carried by a user. Each of the terminal 120 and the terminal 130 may be referred to as "user equipment (UE)," "mobile station," "subscriber station," "remote terminal," "wireless terminal," "user device," or other terms having the equivalent technical meaning, in addition to "terminal."

The base station 110, the terminal 120, and the terminal 130 may transmit and receive wireless signals in a millimeter wave (mmWave) band (e.g., 28 GHz, 30 GHz, 38 GHz, or 60 GHz). In this case, to improve a channel gain, the base station 110, the terminal 120, and the terminal 130 may perform beamforming. Here, the beamforming may include transmission beamforming and reception beamforming. That is, the base station 110, the terminal 120, and the terminal 130 may assign directivity to a transmission signal or a reception signal. To this end, the base station 110 and the terminals 120 and 130 may select serving beams 112, 113, 121, and 131 via a beam search or beam management procedure. After the serving beams 112, 113, 121, and 131 are selected, communication may be performed via resources that are in the quasi co-located (QCL) relationship with resources used for transmitting the serving beams 112, 113, 121, and 131.

According to an embodiment, the base station 110, the terminal 120, and the terminal 130 may transmit and receive wireless signals in a band other than the millimeter wave band. In other words, the band at which the base station 110, the terminal 120, and the terminal 130 transmit and receive wireless signals is not limited to the millimeter wave band. In this case, the base station 110, the terminal 120, and the terminal 130 may perform mutual communication without performing beamforming.

Figure 2:
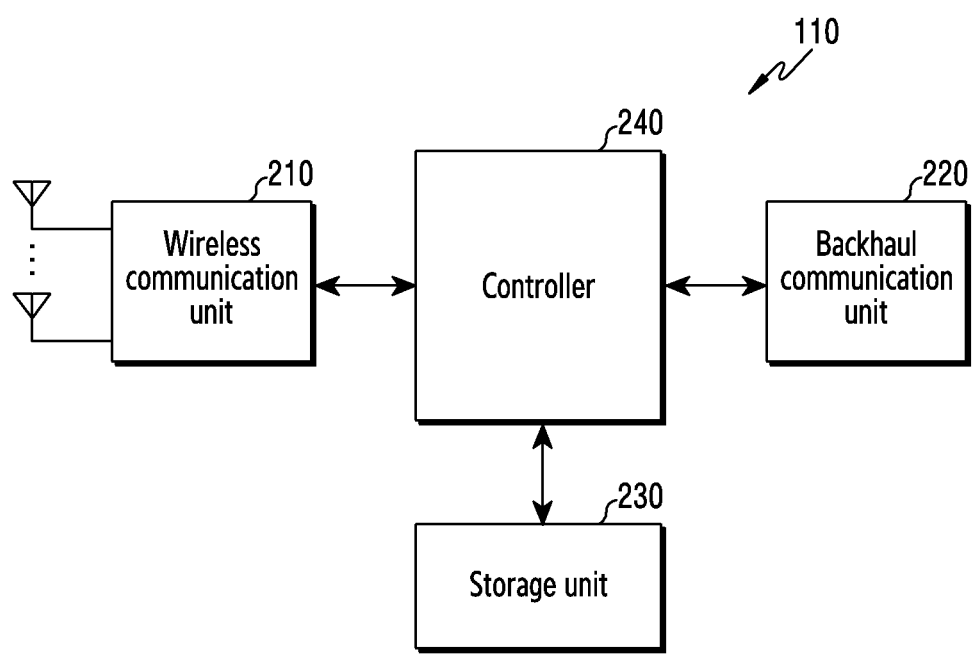
FIG. 2 is a diagram illustrating the configuration of a base station in a wireless communication system according to an embodiment.

FIG. 2 is a diagram illustrating the configuration of a base station 110 in a wireless communication system according to an embodiment. The configuration of FIG. 2 may be understood as a part of the configuration of the base station 110. Hereinafter, it is understood that terms including "unit" or "er" at the end may refer to the unit for processing at least one function or operation and may be implemented in hardware, software, or a combination of hardware and software.

Referring to FIG. 2, the base station 110 may include a wireless communication unit 210 (e.g., wireless communicator or wireless communication interface), a backhaul communication unit 220 (e.g., backhaul communicator or backhaul communication interface), a storage unit 230 (e.g., storage), and a controller 240 (e.g., at least one processing device).

The wireless communication unit 210 executes functions for transmitting and receiving signals via a wireless channel. For example, the wireless communication unit 210 performs a function of conversion between a baseband signal and a bit stream according to the physical layer standard of a system. By way of further example, when data is transmitted, the wireless communication unit 210 generates complex symbols by encoding and modulating a transmission bit stream. Similarly, when data is received, the wireless communication unit 210 restores a reception bit stream by demodulating and decoding a baseband signal. Furthermore, the wireless communication unit 210 up-converts a baseband signal into a radio-frequency (RF) band signal and transmits the same via an antenna, and down-converts an RF band signal received via an antenna into a baseband signal.

For example, the wireless communication unit 210 may include a transmission filter, a reception filter, an amplifier, a mixer, an oscillator, a digital-to-analog convertor (DAC), an analog-to-digital convertor (ADC), and the like. Also, the wireless communication unit 210 may include or utilize a plurality of transmission and reception paths. Furthermore, the wireless communication unit 210 may include at least one antenna array including a plurality of antenna elements. From the perspective of hardware, the wireless communication unit 210 may include a digital unit and an analog unit, and the analog unit may include a plurality of sub-units on the basis of an operating power, an operating frequency, or the like.

The wireless communication unit 210 may transmit and receive a signal as described above. Accordingly, the entirety or a part of the wireless communication unit 210 may be referred to as "transmitting unit," "receiving unit," "transceiving unit," "transmitter," "receiver," or "transceiver." Also, the transmission and reception performed via the wireless channel, which is described hereinbelow, may include the above-described processing performed by the wireless communication unit 210.

The backhaul communication unit 220 provides an interface for performing communication with other nodes within the network. That is, the backhaul communication unit 220 converts a bit stream that is transmitted from the base station 110 to another node, for example, another access node, another base station, an upper node, a core network or the like, into a physical signal, and converts a physical signal received from another node into a bit stream.

The storage unit 230 may store data, such as a basic program, an application program, configuration information, and the like for operating the base station 110. The storage unit 230 may be configured as a volatile memory, a non-volatile memory, or a combination of a volatile memory and a non-volatile memory. In addition, the storage unit 230 may provide data stored therein in response to a request from the controller 240.

The controller 240 may control overall operations of the base station 110. For example, the controller 240 may transmit and receive signals via the wireless communication unit 210 or the backhaul communication unit 220. Further, the controller 240 records data in the storage unit 230 and reads the recorded data. The controller 240 may perform the functions of a protocol stack required by a particular communication standard. To this end, the controller 240 may include at least one processor.

According to an embodiment, the controller 240 may change the state of a terminal between the sub-states of a radio connection state. For example, the controller 240 may perform control such that the base station 110 performs operations according to an embodiment described below.

Figure 3:
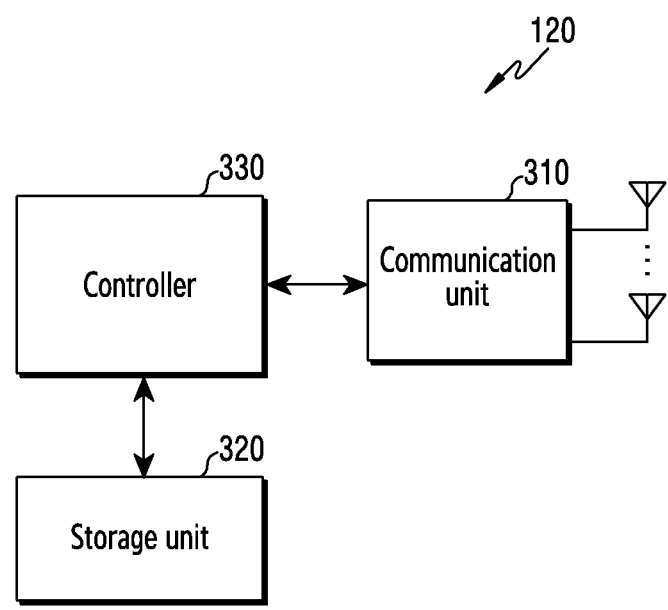
FIG. 3 is a diagram illustrating the configuration of a terminal in a wireless communication system according to an embodiment.

FIG. 3 is a diagram illustrating the configuration of a terminal 120 in a wireless communication system according to an embodiment. The configuration of FIG. 3 may be understood as a part of the configuration of the terminal 120. Hereinafter, it is understood that terms including "unit" or "er" at the end may refer to the unit for processing at least one function or operation and may be implemented in hardware, software, or a combination of hardware and software.

Referring to FIG. 3, the terminal 120 may include a communication unit 310 (e.g., communicator or communication interface), a storage unit 320 (e.g., storage), and a controller 330 (e.g., at least one processor). By way of example, the terminal 120 may be a cellular phone or other device that communicates over a cellular network (such as a 5G or pre-5G network).

The communication unit 310 may perform functions for transmitting and receiving signals via a wireless channel. For example, the communication unit 310 performs a function of conversion between a baseband signal and a bit stream according to the physical layer standard of a system. By way of further example, when data is transmitted, the communication unit 310 generates complex symbols by encoding and modulating a transmission bit stream. Similarly, when data is received, the communication unit 310 restores a reception bit stream by demodulating and decoding a baseband signal. Furthermore, the communication unit 310 up-converts a baseband signal into an RF band signal and transmits the same via an antenna, and down-converts an RF band signal received via an antenna into a baseband signal. For example, the communication unit 310 may include at least one of a transmission filter, a reception filter, an amplifier, a mixer, an oscillator, a DAC, an ADC, and the like.

Also, the communication unit 310 may include or utilize a plurality of transmission and reception paths. In addition, the communication unit 310 may include at least one antenna array including a plurality of antenna elements. From the perspective of hardware, the communication unit 310 may include a digital circuit and an analog circuit (e.g., a radio frequency integrated circuit (RFIC)). Here, the digital circuit and the analog circuit may be implemented as one package. Also, the communication unit 310 may include a plurality of RF chains. In addition, the communication unit 310 may perform beamforming.

The communication unit 310 may transmit and receive a signal as described above. Accordingly, the entirety or a part of the communication unit 310 may be referred to as "transmitting unit," "receiving unit," "transceiving unit," "transmitter," "receiver," or "transceiver." Also, the transmission and reception performed via a wireless channel, which is described hereinbelow, may include the above-described processing performed by the communication unit 310.

The storage unit 320 may store data, such as a basic program, an application program, configuration information, and the like for operating the terminal 120. The storage unit 320 may be configured as a volatile memory, a non-volatile memory, or a combination of a volatile memory and a non-volatile memory. In addition, the storage unit 320 may provide data stored therein in response to a request from the controller 330.

The controller 330 may control overall operations of the terminal 120. For example, the controller 330 may transmit and receive a signal via the communication unit 310. Further, the controller 330 records data in the storage unit 320 and reads the recorded data. The controller 330 may perform the functions of a protocol stack required by a particular communication standard. To this end, the controller 330 may include at least one processor or micro-processor, or may be a part of the processor. Also, a part of the communication unit 310 and the controller 330 may be referred to as a communication processor (CP).

According to an embodiment, the controller 330 may perform control such that a terminal performs operations according to an embodiment described below.

Figure 4:
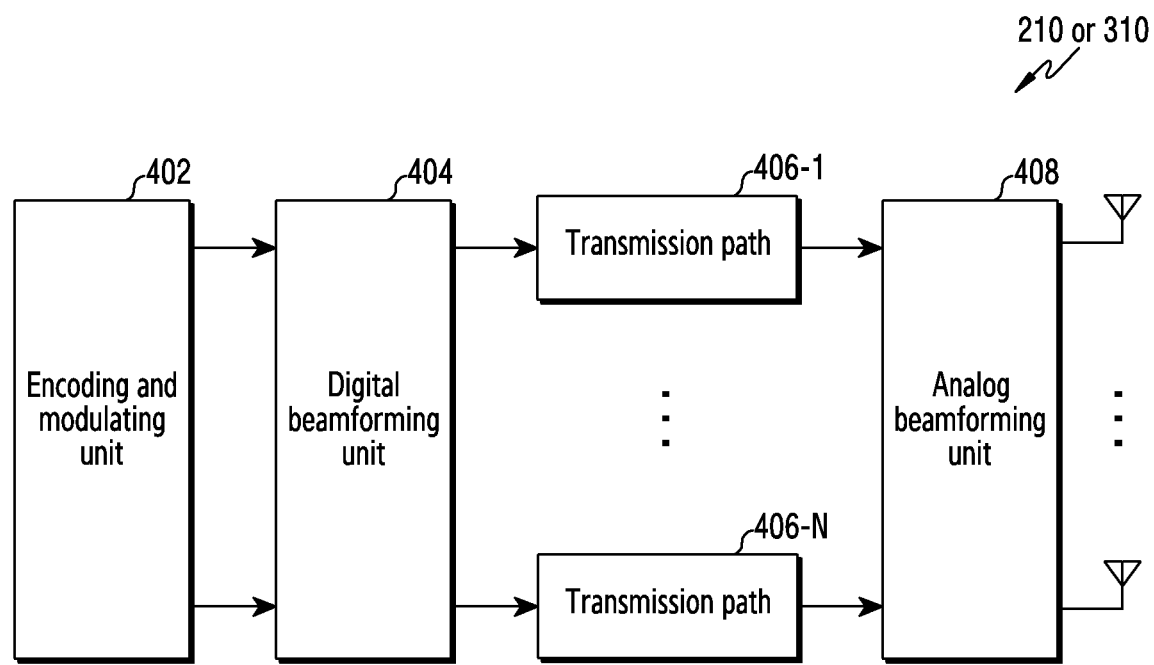
FIG. 4 is a diagram illustrating the configuration of a communication unit in a wireless communication system according to an embodiment.

FIG. 4 is a diagram illustrating the configuration of a communication unit 210 or 310 in a wireless communication system according to an embodiment. FIG. 4 illustrates an example of the detailed configuration of the wireless communication unit 210 of FIG. 2 or the communication unit 310 of FIG. 3. In particular, FIG. 4 illustrates elements for performing beamforming, which are part of the wireless communication unit 210 of FIG. 2 or the communication unit 310 of FIG. 3.

Referring to FIG. 4, the wireless communication unit 210 or the communication unit 310 may include an encoding and modulating unit 402 (e.g., encoder and modulator), a digital beamforming unit 404 (e.g., digital beamformer), a plurality of transmission paths 406-1 to 406-N, and an analog beamforming unit 408 (e.g., analog beamformer).

The encoding and modulating unit 402 may perform channel encoding. To perform channel encoding, at least one of a low density parity check (LDPC) code, a convolution code, and a polar code may be used. The encoding and modulating unit 402 may generate modulated symbols by performing constellation mapping.

The digital beamforming unit 404 may perform beamforming with respect to a digital signal (e.g., modulated symbols). To this end, the digital beamforming unit 404 may apply or multiply beamforming weights to the modulated symbols. Here, the beamforming weights may be used to change the magnitude and the phase of a signal, and may be referred to as "precoding matrix," "precoder," or the like. The digital beamforming unit 404 may output digital-beam-formed modulated symbols to the plurality of transmission paths 406-1 to 406-N. In this case, the modulated symbols may be multiplexed according to a multiple input multiple output (MIMO) transmission scheme, or the same modulated symbols may be provided to the plurality of transmission paths 406-1 to 406-N.

The plurality of transmission paths 406-1 to 406-N may convert the digital-beamformed digital signals into analog signals. To this end, each of the plurality of transmission paths 406-1 to 406-N may include at least one of an inverse fast Fourier transform (IFFT) operation unit, a cyclic prefix (CP) insertion unit, a DAC, or an up-conversion unit. The CP insertion unit is for an orthogonal frequency division multiplexing (OFDM) scheme, and the case in which another physical layer scheme (e.g., filter bank multi-carrier (FBMC)) is applied may be excluded. That is, the plurality of transmission paths 406-1 to 406-N may provide an independent signal processing process for a plurality of streams generated via digital beamforming. Depending on an implementation scheme, some of the elements of the plurality of transmission paths 406-1 to 406-N may be used in common.

The analog beamforming unit 408 may perform beamforming with respect to an analog signal. To this end, the digital beamforming unit 404 may apply or multiply beamforming weights to analog signals. Here, the beamforming weights may be used for changing the magnitude and the phase of a signal.

In a wireless communication system, a terminal may operate in an RRC connected state (RRC_CONNECTED) or in an RRC connection released or RRC idle state (RRC_IDLE). The above-described states of the terminal may be controlled and/or managed in an RRC layer. When a terminal transmits data to a base station or receives data from the base station, the state of the terminal needs to be in the RRC_CONNECTED state and the base station needs to maintain and/or manage the context information of the terminal that is in the RRC_CONNECTED state in an RRC layer, a packet data convergence protocol (PDCP) layer, a radio link control (RLC) layer, and a media access control (MAC) layer. According to various embodiments, "context information of a terminal" is information for performing data communication, and may be referred to as "terminal context information," "terminal context," "UE context information," or "UE context." Also, according to various embodiments, context information may include at least one of a bearer identifier (ID) for data communication, a cell-radio network temporary identifier (C-RNTI) of a terminal, an inactivity timer, a packet data unit (PDU) sequence number, and scheduling related information of a terminal (e.g., channel state information, information associated with the amount of allocated resources, or the like).

When the base station maintains and/or manages the context information of the terminal that is in the RRC_CONNECTED state in all of the RRC layer, the PDCP layer, the RLC layer, and the MAC layer, resources for maintaining and/or managing the context information of the terminal (e.g., hardware resources such as resources for a processing device and a memory, logical resources such as the number of connected users, and the like) need to be allocated to all of the RRC layer, the PDCP layer, the RLC layer, and the MAC layer. Here, the resource of the processing device may include the cycle of a digital signal processing processor (DSP) and/or a central processing unit (CPU).

When the terminal is in the RRC_CONNECTED state but the terminal does not perform data communication, allocating resources for the terminal context information to all of the RRC layer, the PDCP layer, the RLC layer, and the MAC layer may be a waste of hardware resources. Also, in this case, the amount of resources that may be used in the RRC layer may be relatively reduced, and thus, the number of terminals that are in the RRC_CONNECTED state and are managed in the RRC layer may be limited due to the dependency of resources allocated to the PDCP layer, the RLC layer, and the MAC layer.

Therefore, according to an embodiment, a plurality of sub-states may be defined at the RRC_CONNECTED state by taking into consideration whether the terminal actually performs data communication. For example, as the sub-state of the RRC_CONNECTED state, an actively scheduled (AS) state and a semi-actively scheduled (SAS) state may be defined.

The AS state may be the sub-state of the RRC_CONNECTED state in which terminal context information related to data communication, that is information for data communication, is maintained and/or managed in the PDCP layer, the RLC layer, the MAC layer, and the RRC layer. In other words, the AS state may be the sub-state of the RRC state where resources for the terminal context information are allocated in the PDCP layer, the RLC layer, the MAC layer, and the RRC layer. The terminal context information maintained and/or managed in each layer may be construed to be terminal context information associated with each layer. Therefore, in the AS state, resources may be allocated for maintaining and/or managing terminal context information for the RRC layer, terminal context information for the PDCP layer, terminal context information for the RLC layer, and terminal context information for the MAC layer. As another example, the AS state may be a state associated with a terminal that performs data communication.

The SAS state may be the sub-state of the RRC_CONNECTED state in which terminal context information is maintained and/or managed in the RRC layer, but terminal context information is not maintained and/or managed in at least one of the PDCP layer, the RLC layer, and the MAC layer. In other words, the SAS state may be the sub-state of the RRC_CONNECTED state where the resource for terminal context information is allocated in the RRC layer, but may be released in at least one of the PDCP layer, the RLC layer, and the MAC layer. In the SAS state, resources may be allocated for maintaining and/or managing the terminal context information for the RRC layer, but resources for maintaining and/or managing the terminal context information for at least one of the PDCP layer, the RLC layer, and the MAC layer may be released (and therefore conserved). As another example, the SAS state may be a state associated with a terminal that does not perform data communication.

The base station may adaptively change the state of the terminal between the AS state and the SAS state on the basis of whether the terminal performs data communication, so as to increase the number of terminals that are in the RRC_CONNECTED state and are managed in the RRC layer, whereby hardware resources may be efficiently used. For example, when it is determined (or based on a determination) that the terminal in the RRC_CONNECTED state does not perform data communication during a predetermined period of time, the base station changes the state of the corresponding terminal to the SAS state and releases resources for terminal context information in at least one of the PDCP layer, the RCL layer, and the MAC layer, whereby the hardware resources may be prevented from being wasted and the number of terminals that are in the RRC_CONNECTED state and are managed in the RRC layer may be freed from the dependency on other sub-layers.

Hereinafter, a method of changing a state between the sub-states of the RRC_CONNECTED state will be described in detail.

Figure 5:
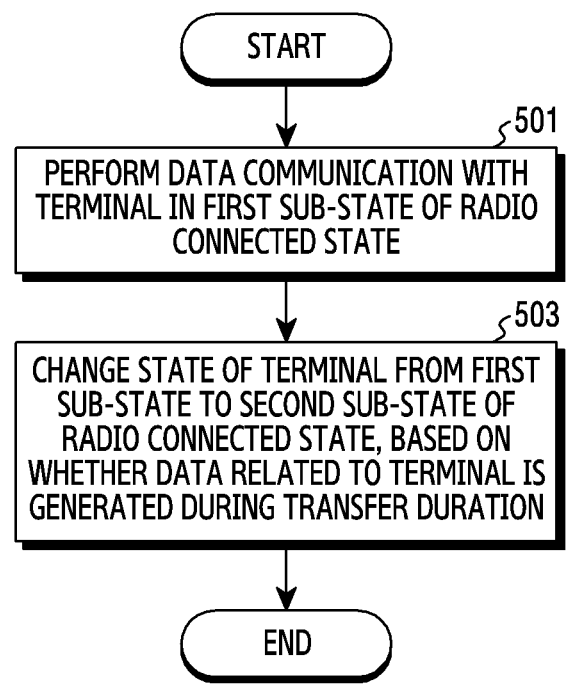
FIG. 5 is a flowchart of a process in which a base station changes the state of a terminal to a semi-actively scheduled (SAS) state in a wireless communication system according to an embodiment.

FIG. 5 is a flowchart illustrating a process in which a base station changes the state of a terminal to the SAS state in a wireless communication system according to an embodiment. FIG. 5 illustrates the operation method of the base station 110.

Referring to FIG. 5, in operation 501, the base station performs data communication with a terminal that is in a first sub-state of a radio connection state. Here, the radio connection state may be the state in which a terminal and a base station are capable of performing data communication, and may include, for example, an RRC connected state. Also, the first sub-state may include the AS state. According to an embodiment, data communication may indicate that a terminal transmits data to a base station and/or receives data from a base station.

In operation 503, the base station changes the state of the terminal from the first sub-state to a second sub-state of the radio connection state on the basis of whether data related to the terminal is generated (or obtained) during a transfer duration. Here, the second sub-state may include the SAS state. According to an embodiment, the transfer duration may be a duration (e.g., a predetermined time period) during (or responsive to) which a transfer from the first sub-state to the second sub-state is triggered, and a condition for triggering may be that data related to the terminal is not generated during the transfer duration. In other words, the base station may monitor whether data related to the terminal is generated during the transfer duration, and when the data related to the terminal is not generated (or received) during the transfer duration, the base station may change the state of the terminal from the first sub-state to the second sub-state. When data related to the terminal is generated during the transfer duration, the base station may not change the state of the terminal and may process the data related to the terminal. According to an embodiment, the data related to the terminal may include downlink data to be transmitted to the terminal and uplink data received from the terminal.

In the present embodiment described with reference to FIG. 5, the transfer or transition from the first sub-state to the second sub-state may be performed. In this case, the transfer may be performed on the basis of data related to the terminal, as described above. However, it is understood that one or more other embodiments are not limited thereto. For example, according to another embodiment, the transfer may be activated only when a predetermined condition is satisfied (or may be activated based at least partially on whether the predetermined condition is satisfied). In this case, the transfer from the first sub-state to the second sub-state may be triggered in the state in which a transfer mode is activated. The transfer mode may be activated on the basis of the degree of congestion of a base station. For example, the degree of congestion of a base station may be determined on the basis of at least one of the number of terminals connected to the base station (or the number of terminals in the RRC_CONNECTED state that are managed by the base station), and the number of radio bearers related to the base station. When the number of terminals connected to the base station is greater than or equal to a threshold terminal number, and/or when the number of radio bearers related to the base station is greater than or equal to a threshold bearer number, the transfer mode may be activated. Conversely, when the number of terminals connected to the base station is less than or equal to the threshold terminal number, or when the number of radio bearers related to the base station is less than or equal to the threshold bearer number, the transfer mode may be deactivated. In the state in which the transfer mode is deactivated, irrespective of whether data related to the terminal is generated during the transfer duration, the state of the terminal may not be changed to the second sub-state. In other words, in the state in which the transfer mode is deactivated, even when the data related to the terminal is not generated during the transfer duration and the transfer duration expires, the state of the terminal may not be changed to the second sub-state. The base station may periodically (e.g., according to predetermined time intervals) or aperiodically determine the degree of congestion of the base station in order to activate or deactivate the transfer mode.

The example of the case in which the base station changes the state of the terminal from the AS state to the SAS state has been described with reference to FIG. 5. In order to change the state of the terminal from the SAS state to the AS state, the base station may monitor whether data related to the terminal is generated during a release duration. According to an embodiment, the release duration is a duration (e.g., predetermined time period) during (or responsive to) which a transfer from the SAS state to the AS state is triggered, and a condition for triggering may be that data related to the terminal is generated during the release duration. In other words, when data related to the terminal is generated during the release duration, the base station may change the state of the terminal from the SAS state to the AS state. The example of changing the state of the terminal to the AS state as data related to the terminal is generated will be described in detail with reference to FIG. 6.

Figure 6:
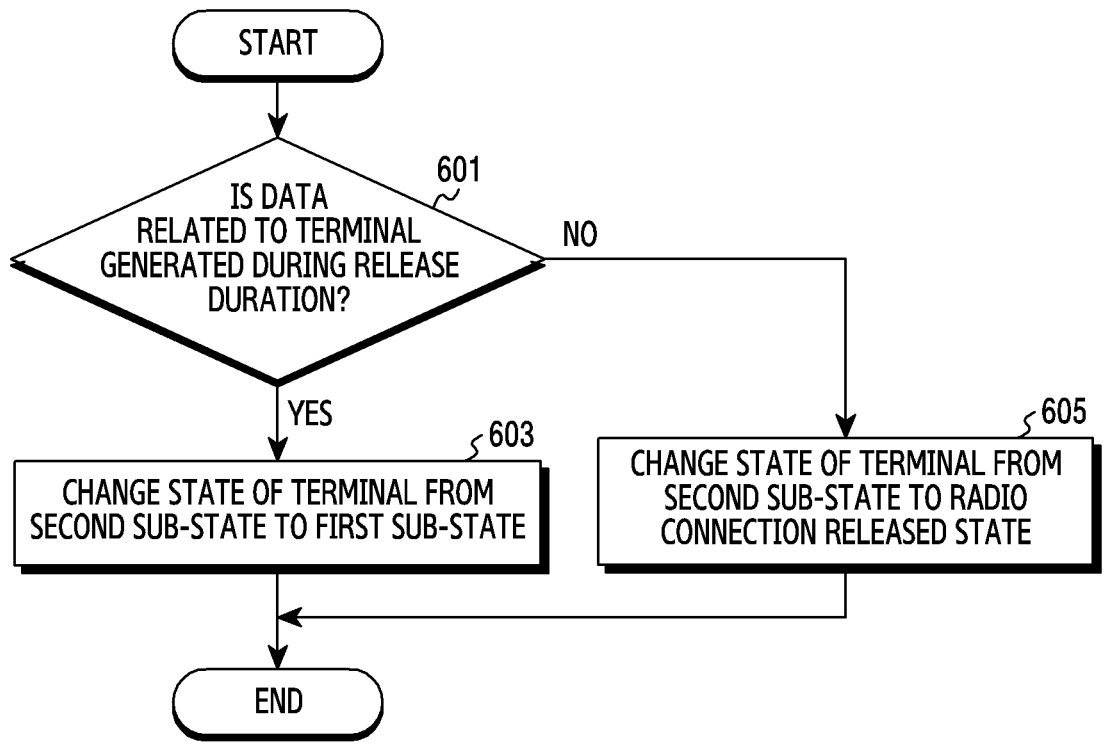
FIG. 6 is a flowchart of a process in which a base station changes the state of a terminal to an actively scheduled (AS) state in a wireless communication system according to an embodiment.

FIG. 6 is a flowchart illustrating a process in which a base station 110 changes the state of a terminal to the AS state as data is generated in a wireless communication system according to an embodiment. FIG. 6 illustrates the operation method of the base station 110. In FIG. 6, it is assumed that the current state of the terminal is the SAS state (i.e., second sub-state).

Referring to FIG. 6, in operation 601, the base station determines whether data related to the terminal is generated during a release duration. For example, the base station receives a random access request from the terminal within the release duration, and may determine that uplink data that the terminal desires to transmit is generated or exists. As another example, the base station may detect downlink data for the terminal, which is received from a backhaul, within the release duration, and may determine that downlink data to be transmitted to the terminal is generated or exists.

When data related to the terminal is generated during the release duration, the base station changes the state of the terminal from the second sub-state to the first sub-state in operation 603. In other words, the base station may change the state of the terminal from the SAS state to the AS state. Since the current state of the terminal (i.e., prior to the transition) is the SAS state, the terminal context information associated with the RRC layer may be maintained and/or managed but terminal context information associated with at least one of the PDCP layer, the RLC layer, and the MAC layer may not be maintained and/or managed. Therefore, in order to change the state of the terminal from the SAS state to the AS state, the base station may generate (or provide) terminal context information in at least one of the PDCP layer, the RLC layer, and the MAC layer. In this case, the base station may generate terminal context information associated with at least one of the PDCP layer, the RLC layer, and the MAC layer, on the basis of the terminal context information in the RRC layer. The base station may allocate resource(s) for the generated terminal context information to at least one of the PDCP layer, the RLC layer, and the MAC layer, and may maintain and/or manage the terminal context information in the layer to which the resource(s) is allocated.

When data related to the terminal is not generated during the release duration, the base station changes the state of the terminal from the second sub-state to a radio connection released state in operation 605. In other words, the base station may change the state of the terminal from the SAS state to the RRC_IDLE state. The terminal in the RRC_IDLE state may be changed to the AS state by receiving paging or performing a random access procedure, and may perform data communication again in the AS state.

Figure 7:
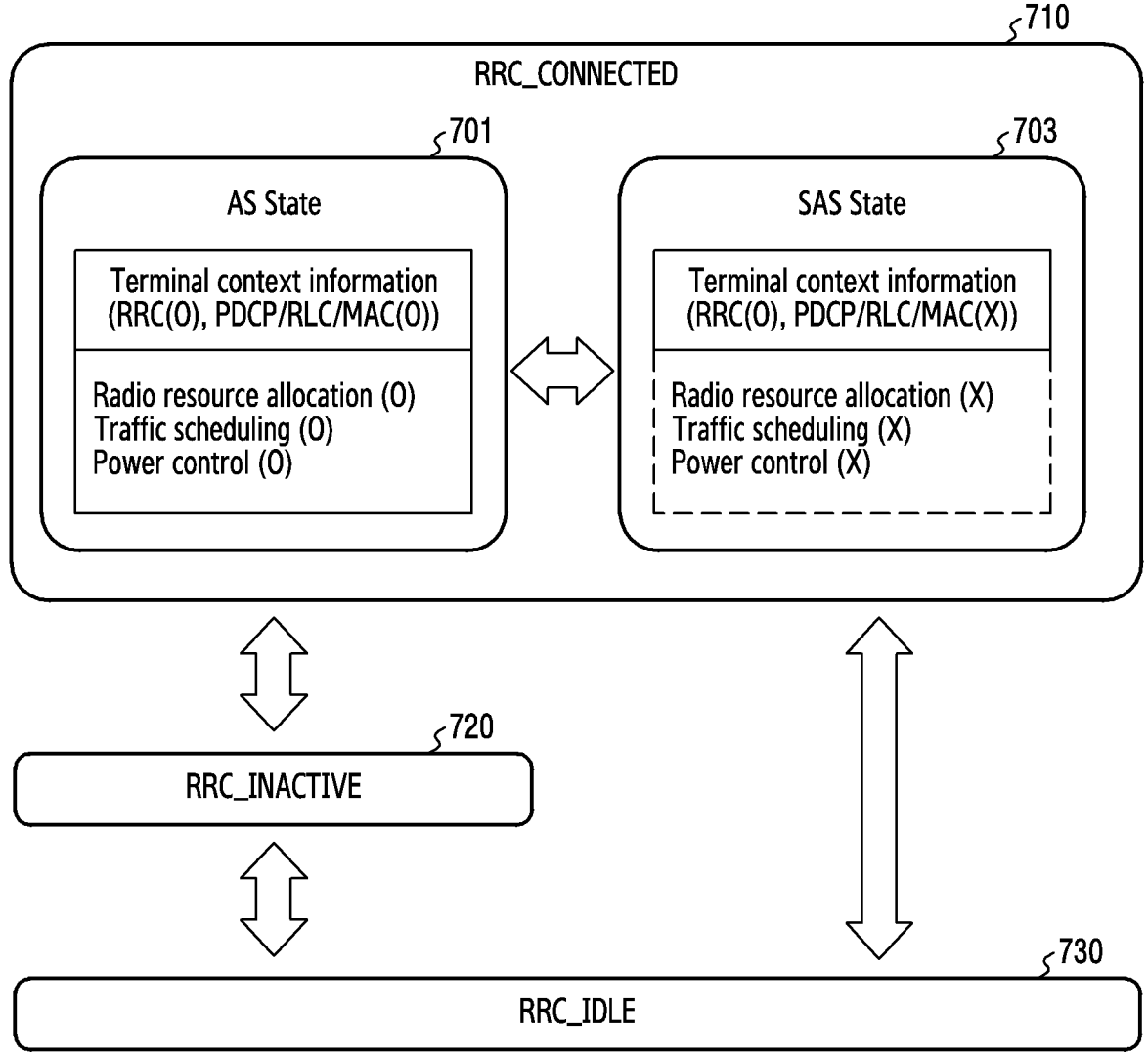
FIG. 7 is a diagram illustrating various states in a wireless communication system according to an embodiment.

FIG. 7 is a diagram illustrating various states in a wireless communication system according to an embodiment.

Referring to FIG. 7, the state of a terminal may include an RRC_CONNECTED state 710, an RRC_INACTIVE state 720, and an RRC_IDLE state 730. According to an embodiment, a terminal in the RRC_CONNECTED state 710 may be referred to as an "RRC_CONNECTED terminal," a terminal in the RRC_INACTIVE state 720 may be referred to as an "RRC_INACTIVE terminal," and a terminal in the RRC_IDLE state 730 may be referred to as an "RRC_IDLE terminal." Also, a sub-state may be defined for the terminal in the RRC_CONNECTED state 710, and the sub-state of the terminal may include an AS state 701 and an SAS state 703.

When the terminal is in the AS state 701, the context information of the terminal may be maintained and/or managed in all of the RRC layer, the PDCP layer, the RLC layer, and the MAC layer. In the case in which the terminal is in the AS state 701, an additional RRC procedure (e.g., RRE, RRC connection reconfiguration) between a base station and the terminal is not required when the base station desires to transmit downlink data to the terminal or when the base station desires to receive uplink data from the terminal. The AS state 701 may be a state in which a physical uplink control channel (PUCCH) for the terminal is allocated (i.e., a state in which the uplink of the terminal is synchronized (IN_SYNC)), and the base station may perform radio resources allocation, traffic scheduling, and/or power control with respect to the terminal in the AS state 701.

When the terminal is in the SAS state 703, the context information of the terminal may be maintained and/or managed in the RRC layer, but may not be maintained and/or managed in at least one of the PDCP layer, the RLC layer, and the MAC layer. In the case in which the terminal is in the SAS state 703, an additional RRC procedure (e.g., RRE, RRC connection reconfiguration) between the base station and the terminal may be required or performed when the base station desires to transmit downlink data to the terminal or when the base station desires to receive uplink data from the terminal. In other words, in order to perform data communication with the terminal, the base station may perform the additional RRC procedure (such as RRE and/or RRC connection reconfiguration) with the terminal, may change the state of the terminal to the AS state, and may perform data communication with the terminal. The SAS state 703 may be a state in which a PUCCH resource for the terminal is released or is not allocated (i.e., a state in which the uplink of the terminal is asynchronized (OUT_OF_SYNC)), and the base station may not perform radio resources allocation, traffic scheduling, and/or power control with respect to the terminal in the SAS state 703. According to one or more other embodiments, in the SAS state 703, a PUCCH resource may not be released and a state in which the PUCCH resource is allocated may be maintained. In other words, the SAS state and the release of a PUCCH resource may not be related to each other. Also, there may be no relationship between the SAS state and traffic scheduling and power control. In other words, the base station may or may not perform traffic scheduling, and may or may not perform power control with respect to the terminal in the SAS state 703.

Also, according to an embodiment, the RRC_INACTIVE state 720 may be defined in addition to the RRC_CONNECTED state 710 and the RRC_IDLE state 730. In the RRC_INACTIVE state 720, the connection between a terminal and a radio base station may be deactivated, but the connection between a core network for the corresponding terminal and the radio base station is maintained. The RRC_INACTIVE state 720 may be different from the RRC_CONNECTED state 710 and the RRC_IDLE state 730, and may be different from the AS state 701 and the SAS state 703 that are sub-states of the RRC_CONNECTED state 710.

According to various embodiment, a terminal in the AS state 701 may be referred to as an "AS terminal" and a terminal in the SAS state 703 may be referred to as an "SAS terminal." Hereinafter, a resource allocation method for maintaining and/or managing terminal context information for each of an AS terminal and an SAS terminal will be described with reference to FIG. 8.

Figure 8:
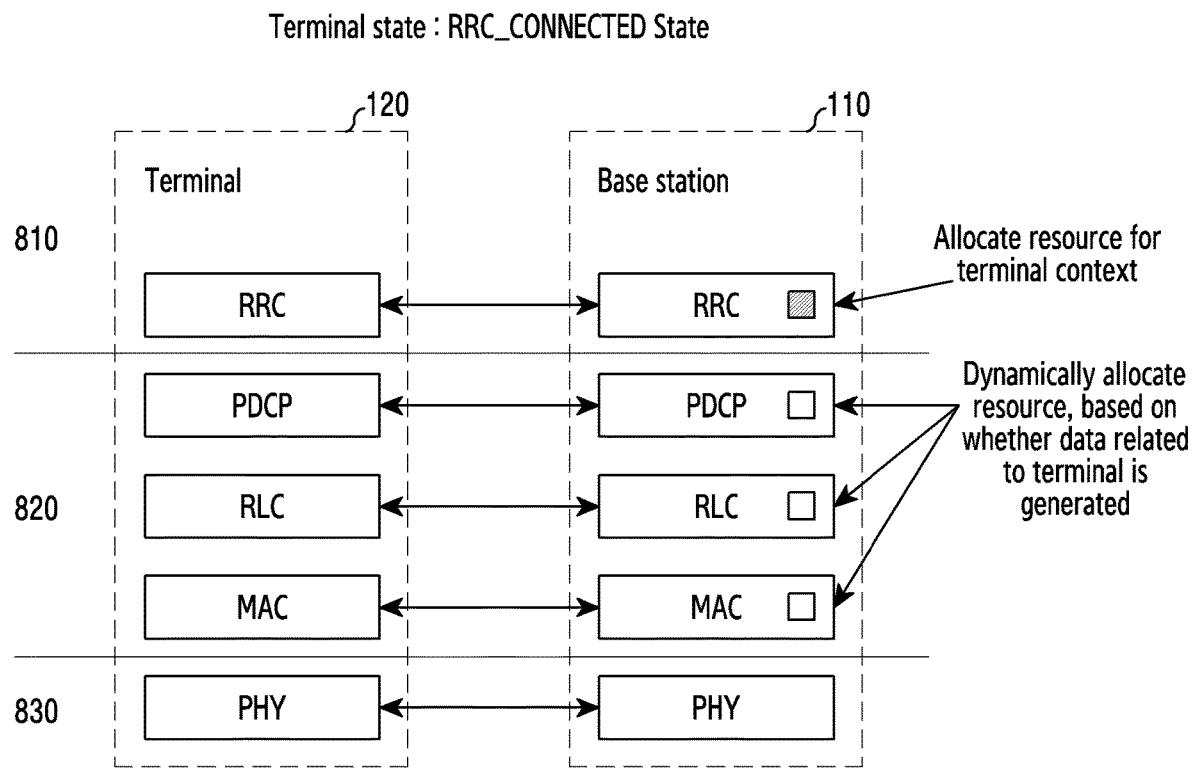
FIG. 8 is a diagram illustrating the case of dynamically allocating a resource for terminal context information to each layer in a wireless communication system according to an embodiment.

FIG. 8 is a diagram illustrating the case of dynamically allocating a resource for terminal context information to each layer in a wireless communication system according to an embodiment.

According to an embodiment, protocol layers in a wireless communication system may be divided into or may include a first layer 810, a second layer 820, and a third layer 830. The first layer 810 may include an RRC layer, and may be referred to as a "control plane." The second layer 820 may include at least one of the PDCP layer, the RLC layer, and the MAC layer, and may be referred to as layer 2 (L2). The third layer 830 includes the PHY layer, and may be referred to as layer 1 (L1).

A base station may maintain and/or manage the context information of an AS terminal and the context information of an SAS terminal in the first layer 810, and may allocate a resource for the context information of the AS terminal and a resource for the context information of the SAS terminal to the first layer 810.

Conversely, the base station may maintain and/or manage the context information of the AS terminal in the second layer 820, but does not maintain and/or manage the context information of the SAS terminal. In other words, the base station may allocate the resource for the context information of the AS terminal in the second layer 820, but may release the resource for the context information of the SAS terminal in the second layer 820. The base station may change the sub-state of the terminal that is in the RRC_CONNECTED state (e.g., from the AS state to the SAS state, or from the SAS state to the AS state) depending on whether data related to the terminal is generated or obtained, whereby the resource for the context information of the terminal may be dynamically allocated to the second layer 820.

However, according to one or more other embodiments, the base station may maintain and/or manage the context information of the AS terminal and the context information of the SAS terminal in the second layer 820. In other words, the base station may adaptively determine whether to maintain and/or manage the context information of the SAS terminal in the second layer.

Hereinafter, various causes of triggering a state transfer or a sub-state transfer of a terminal will be described with reference to FIG. 9.

Figure 9:
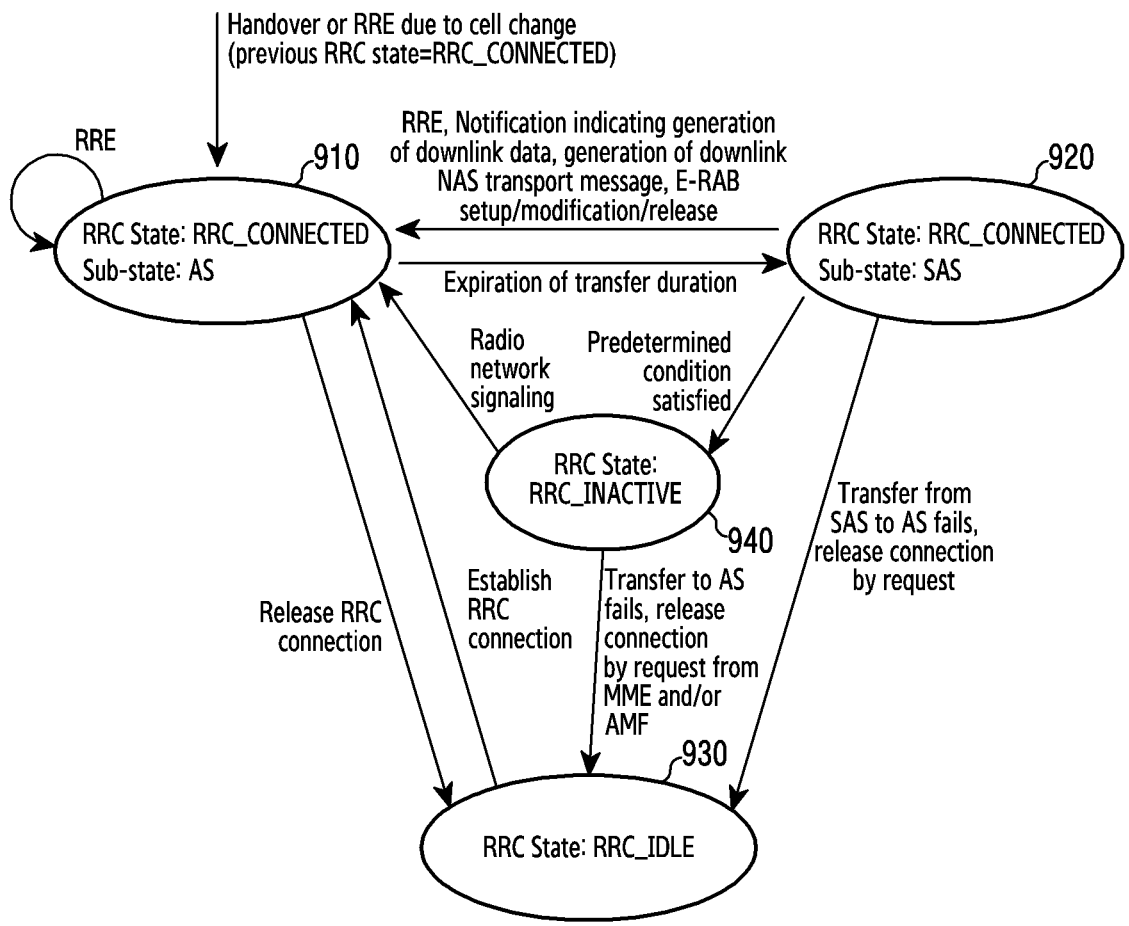
FIG. 9 is a diagram illustrating a state transfer in a wireless communication system according to an embodiment.

FIG. 9 is a diagram illustrating a state transfer in a wireless communication system according to an embodiment.

Referring to FIG. 9, the state of a terminal may be one of a state 910, a state 920, a state 930, and a state 940. The state 910 may indicate that the RRC state of a terminal is the RRC_CONNECTED state and the sub-state thereof is the AS state. The state 920 may indicate that the RRC state of the terminal is the RRC_CONNECTED state and the sub-state thereof is the SAS state. In other words, the state 910 and the state 920 have different sub-states in the same RRC_CONNECTED state. The state 930 may indicate that the RRC state of the terminal is the RRC_IDLE state, and the state 940 may indicate that the RRC state of the terminal is the RRC_INACTIVE state.

The state of the terminal may be changed from the state 930 to the state 910 according to RRC connection setup, or may be changed from the state 910 to the state 930 according to RRC connection release. Also, when a terminal in the state of a radio link failure (RLF) performs RRE, or when RRE is performed as a terminal in the RRC_CONNECTED state changes a cell, the state of the terminal may be changed to the state 910. As another example, when a terminal in the RRC_CONNECTED state performs handover from a neighboring base station, the state of the terminal may be changed to the state 910.

According to an embodiment, the state of the terminal may be changed from the state 910 to the state 920. For example, the state of the terminal may be changed from the state 910 to the state 920 based on a transfer duration expiring. In this case, the base station may monitor whether data related to the terminal is generated or obtained during the transfer duration, and when the data related to the terminal is not generated or obtained during the transfer duration and the transfer duration expires, the base station may change the state of the terminal from the state 910 to the state 920.

According to an embodiment, the state of the terminal may be changed from the state 920 to the state 910. For example, the state of the terminal may be changed from the state 920 to the state 910 due to RRE. When uplink data to be transmitted by the terminal is generated, the terminal may perform a random access procedure with the base station and may perform an RRE procedure with the base station. In response to the RRE, the base station may change the state of the terminal from the state 920 to the state 910. As another example, the state of the terminal may be changed from the state 920 to the state 910 on the basis of a notification indicating that downlink data is generated or obtained. The base station may detect downlink data received via a backhaul, and may provide a notification indicating that the downlink data is generated to the RRC layer. In response to the notification, the base station may change the state of the terminal from the state 920 to the state 910. As another example, when a non-access stratum (NAS) transport message is generated, the base station may change the state of the terminal from the state 920 to the state 910. As another example, the base station may change the state of the terminal from the state 920 to the state 910, in order to set, change, or release an evolved universal terrestrial radio access network (E-UTRAN) radio access bearer (E-RAB).

According to an embodiment, the state of the terminal may be changed from the state 920 to the state 930. For example, when the transfer from the state 920 to the state 910 (i.e., the transfer from the SAS state to the AS state) fails, the state of the terminal may be changed from the state 920 to the state 930. In this case, the base station may monitor whether data related to the terminal is generated or obtained during a release duration. When data related to the terminal is not generated during the release duration, and the release duration expires, the base station may determine that the transfer from the state 920 to the state 910 fails, and may change the state of the terminal from the state 920 to the state 930. As another example, the state of the terminal may be changed from the state 920 to the state 910 by request from a mobility management entity (MME) and/or an authentication management field (AMF). As another example, the state of the terminal may be changed from the state 920 to the state 930 according to release of the RRC connection.

When the terminal in the state 920 satisfies a predetermined condition (e.g., a predetermined period of time elapses), the state of the terminal may be changed to the state 940, and the terminal in the state 940 may transfer to the state 910 on the basis of a radio network signaling. That is, the connection between the base station and a core network is maintained in the state 940, a core network signaling may not be required for changing the state of the terminal from the state 940 to the state 910, and only a radio network signaling may be required. When the transfer from the state 940 to the state 910 fails or when a request for releasing a wireless connection is received from the core network entity (e.g., MME and/or AMF), the state of the terminal may be changed from the state 940 to the state 930.

As described above, according to an embodiment, the base station may change the sub-state of a terminal that is in the RRC_CONNECTED state (e.g., from the AS state to the SAS state or from the SAS state to the AS state). However, the sub-state transfer may be performed inside the base station, and the terminal is not informed of the same, whereby the terminal may not recognize the sub-state transfer.

Hereinafter, a detailed procedure for performing a sub-state transfer of a terminal will be described with reference to FIGS. 10, 11A, and 11B.

Figure 10:
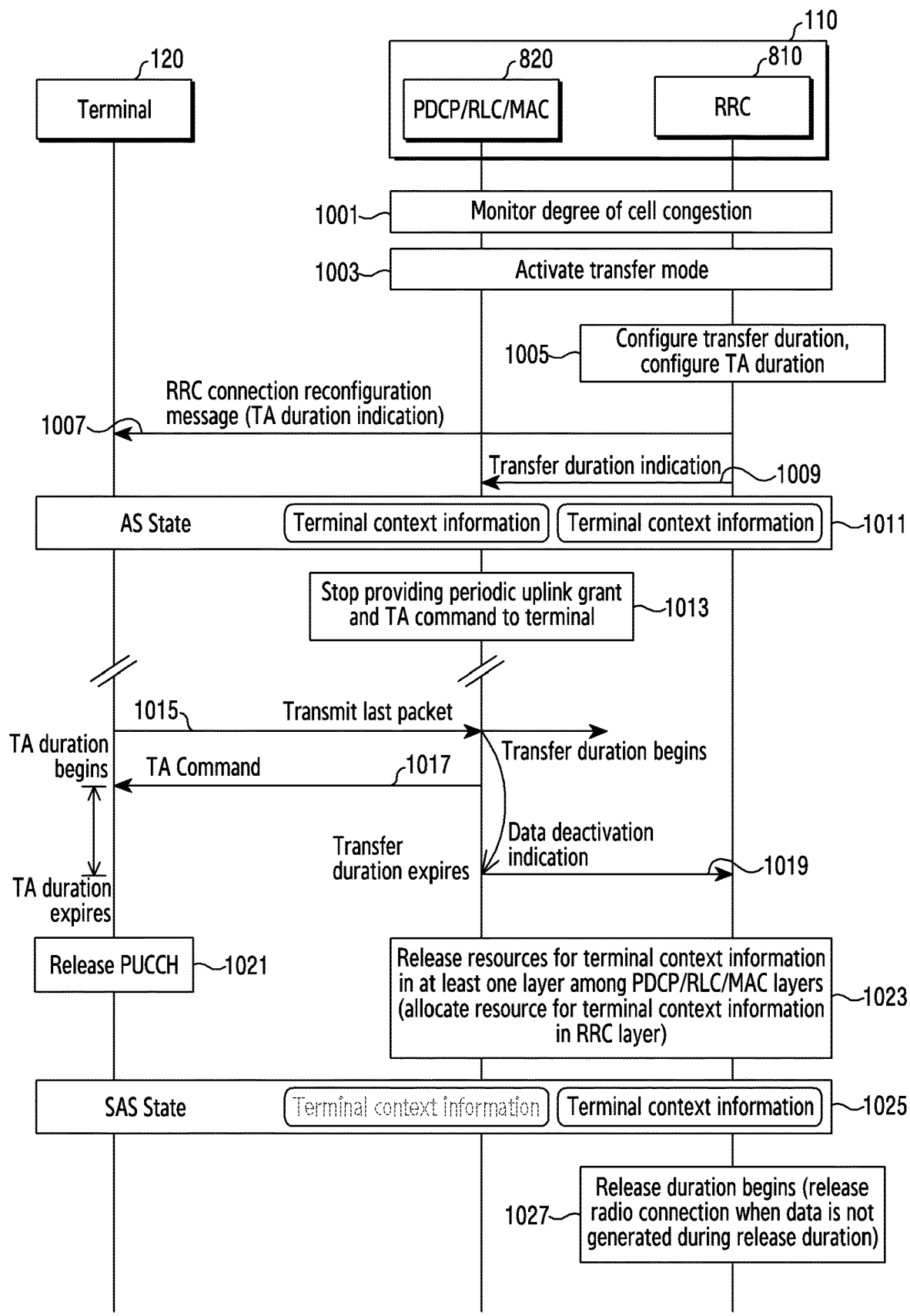
FIG. 10 is a diagram illustrating a signal flow between a base station and a terminal in order to change the state of the terminal to an SAS state in a wireless communication system according to an embodiment.

FIG. 10 is a diagram illustrating a signal flow between a base station 110 and a terminal 120, in order to change the state of the terminal to the SAS state in a wireless communication system according to an embodiment. FIG. 10 illustrates a signal flow between the terminal 120 and the base station 110.

Referring to FIG. 10, in operation 1001, the base station 110 may monitor the degree of cell congestion. For example, the base station 110 may monitor at least one of the number of terminals connected to the base station 110 (or the number of terminals in the RRC_CONNECTED state that are managed by the base station 110), and the number of radio bearers related to the base station 110, in order to determine the degree of cell congestion.

In operation 1003, the base station 110 may activate a transfer mode. When the number of terminals connected to the base station 110 is greater than or equal to a threshold (e.g., predetermined or pre-set) terminal number, or when the number of radio bearers related to the base station 110 is greater than or equal to a threshold (e.g., predetermined or pre-set) bearer number, the transfer mode may be activated. The transfer mode may indicate whether to perform a sub-state transfer (that is, a transfer between the AS state and the SAS state). For example, when the transfer mode is activated, the base station 110 may perform a sub-state transfer.

Further, when the number of terminals connected to the base station 110 is less than or equal to the threshold terminal number, or when the number of radio bearers related to the base station 110 is less than or equal to the threshold bearer number, the transfer mode may be deactivated. When the transfer mode is deactivated, the base station 110 may not perform a sub-state transfer, whereby operation 1003 and operations subsequent thereto may not be performed.

In operation 1005, the base station 110 may configure a transfer duration, and may configure a timing alignment (TA) duration. The transfer duration may be configured to be shorter than an inactivity duration. According to an embodiment, the inactivity duration is a duration (e.g., predetermined time period) for triggering a transfer from the RRC_CONNECTED state to the RRC_IDLE state when the transfer mode is deactivated, and a condition for triggering may be that data related to the terminal 120 is not generated or obtained during the inactivity duration. In other words, when the transfer mode is deactivated, data related to the terminal 120 is not generated during the inactivity duration, and the inactivity duration expires, the base station 110 may change the state of the terminal 120 from the RRC_CONNECTED state to the RRC_IDLE state. The expiration of the inactivity duration may be measured by an inactivity timer. Also, according to an embodiment, the TA duration may be a duration (e.g., predetermined time period) in which (or responsive to which) release of a PUCCH resource may be indicated to the terminal 120. For example, when the terminal 120 does not perform data transmission and reception during the TA duration and the TA duration expires, the terminal 120 may recognize that a PUCCH resource for the terminal 120 is released (i.e., the uplink of the terminal 120 is asynchronized), and may recognize that the terminal 120 needs or is to perform a random access procedure in order to transmit uplink data. According to an embodiment, the TA duration may be configured to be shorter than the transfer duration.

In operation 1007, the base station 110 may indicate the TA duration to the terminal 120. The base station 110 may indicate the TA duration to the terminal 120 via an RRC connection reconfiguration message. That is, the RRC connection reconfiguration message may include information indicating the TA duration. The RRC connection reconfiguration message may be signaled via the first layer 810.

In operation 1009, the base station 110 may indicate the transfer duration. In particular, the first layer 810 of the base station 110 may indicate the transfer duration to the second layer 820 (e.g., at least one of the PDCP layer, the RLC layer, and the MAC layer).

Although FIG. 10 illustrates that operation 1009 is performed after operation 1007, this is merely an example, and the order of operations 1007 and 1009 may be changeable. In other words, operation 1007 may be performed after operation 1009, and/or operation 1007 and operation 1009 may be performed in parallel.

In operation 1011, the state of the terminal 120 is the AS state. In the AS state, the context information of the terminal 120 may be maintained and/or managed in the first layer 810 and the second layer 820, and resources for the context of the terminal 120 may be allocated to the first layer 810 and the second layer 820.

In operation 1013, the base station 110 may stop providing a periodic uplink (UL) grant and a periodic TA command to the terminal 120. In other words, the terminal 120 may transfer to the SAS state since the transfer mode is activated in operation 1003. Accordingly, the base station 110 may stop providing a periodic UL grant and a periodic TA command to the terminal 120.

In operation 1015, the terminal 120 transmits a packet to the base station 110. The packet in operation 1015 may be the last packet among packets that the terminal 120 transmits to the base station 110, and the packet may include an indicator indicating that the corresponding packet is the last packet. As another example, after completion of uplink data transmission, the terminal 120 may transmit a separate message indicating that the uplink data transmission is completed to the base station 110. In response to the reception of the last packet by the base station 110, the transfer duration may begin. In other words, in response to the reception of the last packet, the base station 110 may activate a transfer duration timer for measuring the progress of the transfer duration.

In operation 1017, the terminal 120 may receive a TA command from the base station 110. When the terminal 120 completes packet transmission, the base station 110 may not transmit a TA command any longer. When the terminal 120 fails to receive a TA command again within a predetermined period of time after receiving a TA command, the TA duration expires.

In operation 1019, in response to the expiration of the transfer duration, the base station 110 may indicate deactivation of data. More particularly, the base station 110 may monitor whether data related to the terminal 120 is generated during the transfer duration. In this case, when the data related to the terminal 120 is not generated during the transfer duration and the transfer duration expires, the second layer 820 of the base station 110 may indicate deactivation of the data to the first layer 810. According to an embodiment, the deactivation of data may indicate that data related to the terminal 120 is not generated during the transfer duration. Furthermore, when data related to the terminal 120 is generated or obtained within the transfer duration, the transfer duration timer may be initialized and the base station 110 is capable of performing data communication with the terminal 120.

In operation 1021, in response to the expiration of the TA duration, the terminal 120 may recognize that a PUCCH resource allocated to the terminal 120 is released. Also, in operation 1021, the uplink of the terminal 120 may be asynchronized. Depending on implementation, the TA duration and the transfer duration may be configured to expire at the same time in both the terminal 120 and the base station 110.

Although FIG. 10 illustrates that operation 1021 is performed after operation 1019, this is merely an example, and the order of operations 1019 and 1021 may be changeable. In other words, operation 1019 may be performed after operation 1021, and/or operation 1019 and operation 1021 may be performed in parallel.

According to an embodiment, irrespective of the sub-state of the terminal 120, a PUCCH resource may not be released. In this instance, operation 1021 may be omitted. Also, the operation of configuring the TA duration in at least one of operation 1005, operation 1007, operation 1013, and operation 1017 may be omitted.

In operation 1023, the base station 110 may release a resource for the context information of the terminal 120 in at least one layer (i.e., the second layer 820) from among the PDCP/RLC/MAC layers. In other words, the base station 110 may not maintain and/or manage the context information of the terminal 120 for at least one layer from among the PDCP/RLC/MAC layers, and may release the resource for at least one layer from among the PDCP/RLC/MAC layers. Accordingly, the data radio bearer (DRB) of the corresponding terminal 120 may not be managed in at least one layer from among the PDCP/RLC/MAC layers, and may be excluded from a processing logic. According to an embodiment, the fact that the context information of the terminal 120 associated with at least one of the PDCP/RLC/MAC layers is not maintained and/or managed may indicate that the context information of the terminal 120 is deleted from a memory related to at least one layer from among the PDCP/RLC/MAC layers. In this instance, the base station 110 may continuously maintain and/or manage the context information of the terminal 120 associated with the RRC layer 810, and may not release the resource for the context information of the terminal 120 in the RRC layer 810. In other words, in operation 1023, the resource for the context information of the terminal 120 is maintained as it is allocated in the RRC layer 810.

In operation 1025, the base station 110 may change the state of the terminal 120 from the AS state to the SAS state. In the SAS state, the resource for the context information of the terminal 120 of the second layer 820 is released, and the resource for the context information of the terminal 120 of the first layer 810 may be maintained as it is allocated. In other words, in the SAS state, the context information of the terminal 120 associated with the second layer 820 is not maintained and/or managed, but the context information of the terminal 120 associated with the first layer 810 is maintained and/or managed.

Although it is illustrated that operations 1023 and 1025 are independent from each other in FIG. 10, operations 1023 and 1025 may be performed in parallel. In other words, in response to the data deactivation indication in operation 1019, the base station 110 may change the state of the terminal 120 to the SAS state and may release the resource for the context information of the terminal 120 in the second layer 820.

In operation 1027, a release duration begins. In other words, the base station 110 may activate a release duration timer for measuring the progress of the release duration. Furthermore, the base station 110 may monitor whether data related to the terminal 120 is generated during the release duration. When data related to the terminal 120 is not generated during the release duration, the base station 110 may change the state of the terminal 120 from the SAS state to the RRC_IDLE state. Conversely, when data related to the terminal 120 is generated during the release duration, the base station 110 may perform operations illustrated in FIGS. 11A or FIG. 11B, depending on whether the generated data is uplink data or downlink data.

According to one or more other embodiments, a transfer mode may always be activated irrespective of the degree of cell congestion. In other words, the transfer mode may always be activated, as the default. In this instance, operations 1001 to 1003 may be omitted, and operations subsequent thereto may be performed.

Figure 11A:
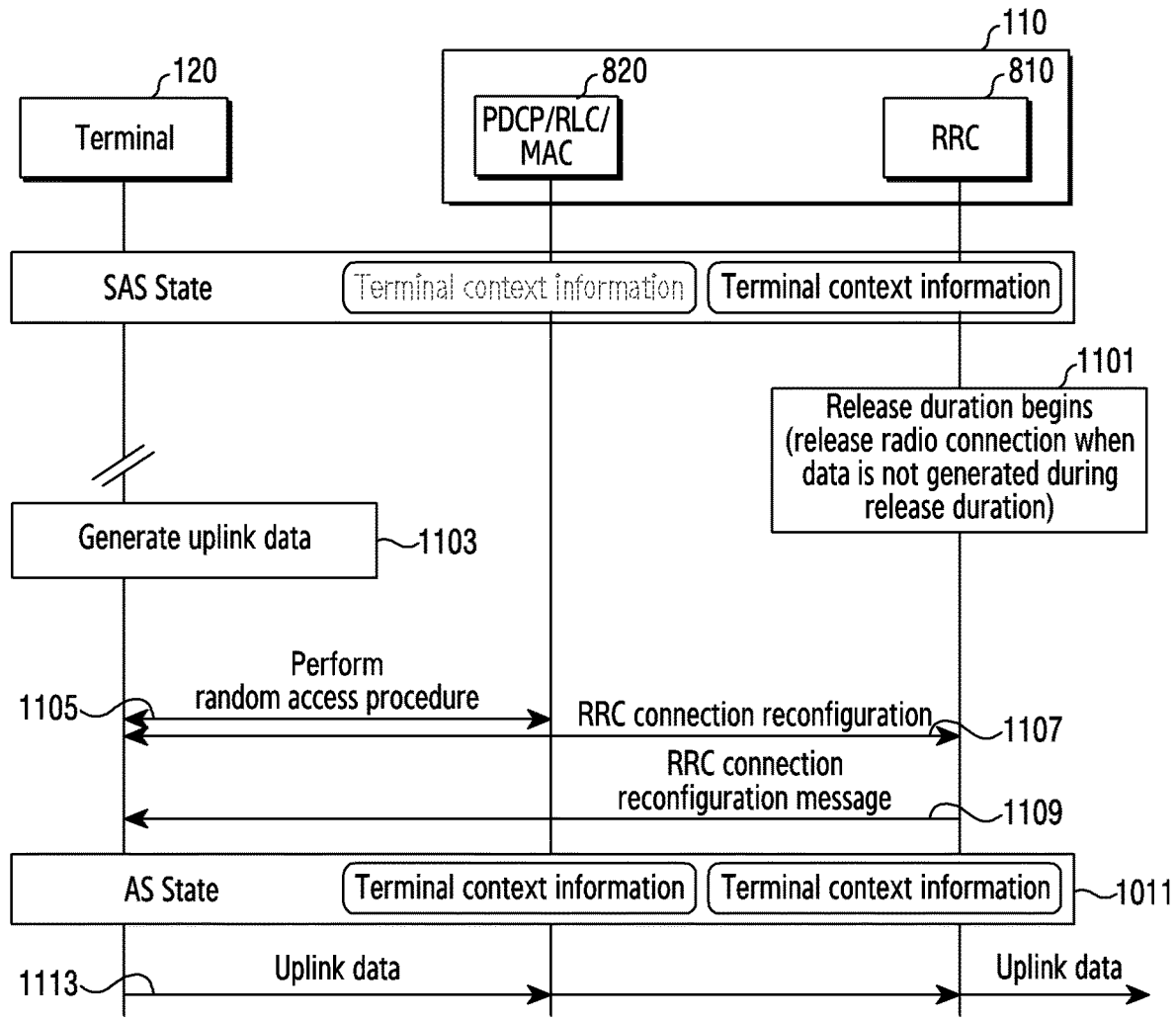
FIGS. 11A and 11B are diagrams illustrating a signal flow between a base station and a terminal in order to change the state of the terminal to an AS state in a wireless communication system according to various embodiments.

FIG. 11A is a signal flow between a base station and a terminal 120 in order to change the state of the terminal 120 to the AS state as uplink data is generated in a wireless communication system according to an embodiment. FIG. 11A illustrates a signal flow between the terminal 120 and the base station 110.

Referring to FIG. 11A, it is assumed that the terminal 120 was in the SAS state before operation 1101. In other words, before operation 1101, the context information of the terminal 120 associated with the second layer 820 was not maintained and/or managed and the resource for the context information of the terminal 120 was released in the second layer 820.

In operation 1101, a release duration begins. In other words, the base station 110 may activate a release duration timer for measuring the progress of the release duration. Operation 1101 may be the same as or similar to the operation performed in operation 1027 of FIG. 10.

In operation 1103, the terminal 120 may recognize that uplink data is generated or obtained. In other words, the terminal 120 may identify uplink data to be transmitted to the base station 110. For example, when the terminal 120 sends a voice call, desires to transmit a text message, or desires to request a content associated with a predetermined application, the terminal 120 may identify the generation of uplink data to be transmitted to the base station 110.

In operation 1105, the terminal 120 may perform a random access procedure with the base station 110. The terminal 120 may transmit a random access preamble to the base station 110, and in response to detection of the preamble, the base station 110 may recognize that uplink data associated with the terminal 120 is generated. Accordingly, the base station 110 may deactivate the release duration timer, and may transmit a random access response to the terminal 120.

In operation 1107, the terminal 120 may perform an RRC connection reconfiguration procedure with the base station 110. In other words, the terminal 120 may perform RRE with the base station 110. Via the RRE, the base station 110 may generate context information of the terminal 120 associated with the second layer 820. In this instance, the base station 110 may generate the context information of the terminal 120 associated with the second layer 820, on the basis of the context information of the terminal 120 associated with the first layer 810. That is, in the SAS state, the context information of the terminal 120 associated with the second layer 820 is not maintained and/or managed, but the context information of the terminal 120 associated with the first layer 810 is maintained and/or managed. Accordingly, the base station 110 may generate the context information of the terminal 120 associated with the second layer 820 on the basis of the context information of the terminal 120 associated with the first layer 810. The base station 110 may reallocate a resource for the generated context information of the terminal 120 to the second layer 820, and may maintain and/or manage the context information of the terminal 120 in the second layer 820.

In operation 1109, the base station 110 may transmit an RRC connection reconfiguration message to the terminal 120. The base station 110 may allocate a PUCCH resource for the terminal 120 via the RRC connection reconfiguration message. Accordingly, the uplink of the terminal 120 may be synchronized. According to an embodiment, the base station 110 may allocate a PUCCH resource for the terminal 120 by transmitting a system information block (SIB) to the terminal 120.

In operation 1111, the base station 110 may change the state of the terminal 120 from the SAS state to the AS state.

In operation 1113, the terminal 120 transmits the uplink data to the base station 110. The terminal 120 and the base station 110 may communicate with each other using the context information of the terminal 120 of the first layer 810 and the second layer 820, and the terminal 120 may transmit the uplink data to the base station 110. Furthermore, after uplink data transmission is completed in operation 1113, the transfer duration may begin as illustrated in FIG. 10, and operation 1017 and operations subsequent thereto may be performed.

Figure 11B:
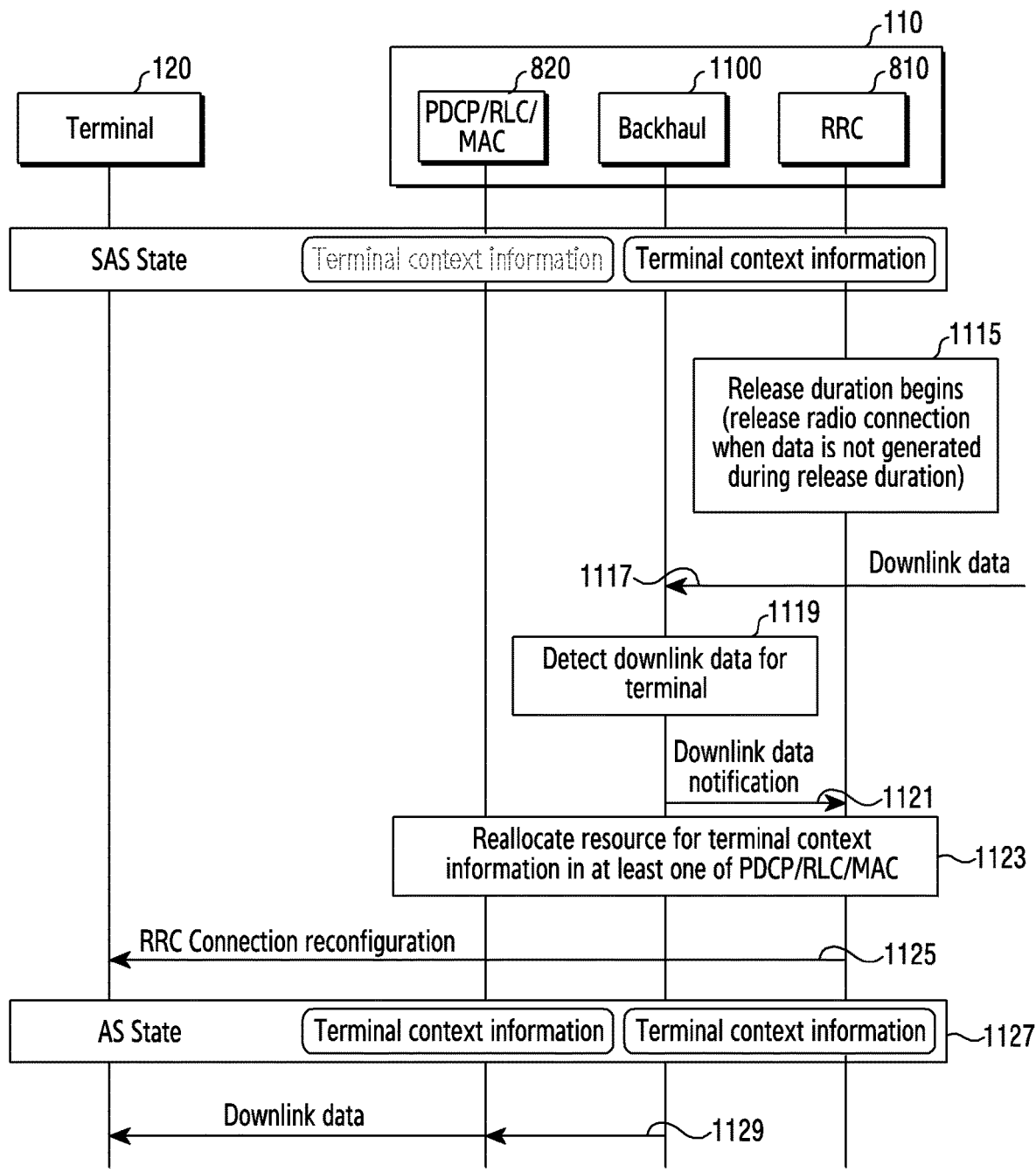

FIG. 11B is a signal flow between a base station 110 and a terminal 120 in order to change the state of the terminal 120 to the AS state as downlink data is generated or obtained in a wireless communication system according to an embodiment. FIG. 11B illustrates a signal flow between the terminal 120 and the base station 110.

Referring to FIG. 11B, it is assumed that the terminal 120 was in the SAS state before operation 1115. In other words, before operation 1115, the context information of the terminal 120 associated with the second layer 820 was not maintained and/or managed and the resource for the context information of the terminal 120 was released in the second layer 820.

In operation 1115, a release duration begins. In other words, the base station 110 may activate a release duration timer for measuring the progress of the release duration. Operation 1115 may be the same as or similar to the operation performed in operation 1027 of FIG. 10.

In operation 1117, the base station 110 may receive downlink data for the terminal 120 via a backhaul 1100. According to an embodiment, the base station 110 may buffer the received downlink data in a layer related to the backhaul 1100. For example, the layer related to the backhaul 1100 may include a general packet radio service (GPRS) tunneling protocol (GTP) layer.

In operation 1119, the base station 110 may detect the downlink data for the terminal 120. The base station 110 may detect the downlink data for the terminal 120 received via the backhaul, and may determine that downlink data to be transmitted to the terminal 120 is generated. Accordingly, the base station 110 may deactivate the release duration timer.

In operation 1121, the base station 110 may provide a notification indicating that downlink data is generated to the first layer 810. For example, in the base station 110, the layer related to the backhaul 1100 may indicate the notification indicating that downlink data is generated to the first layer 810.

In operation 1123, the base station 110 may reallocate a resource for the context information of the terminal 120 in at least one layer from among the PDCP/RLC/MAC layers. The base station 110 may generate the context information of the terminal 120 associated with the second layer 820, in response to the notification of operation 1121. In this case, similar to operation 1107, the base station 110 may generate the context information of the terminal 120 associated with the second layer 820, on the basis of the context information of the terminal 120 associated with the first layer 810. The base station 110 may reallocate a resource for the generated context information of the terminal 120 to the second layer 820, and may maintain and/or manage the context information of the terminal 120 in the second layer 820.

In operation 1125, the base station 110 may transmit an RRC connection reconfiguration message to the terminal 120. The base station 110 may allocate a PUCCH resource for the terminal 120 via the RRC connection reconfiguration message. Accordingly, the uplink of the terminal 120 may be synchronized. According to an embodiment, the base station 110 may allocate a PUCCH resource for the terminal 120 by transmitting an SIB to the terminal 120.

In operation 1127, the base station 110 may change the state of the terminal 120 from the SAS state to the AS state.

In operation 1129, the base station 110 transmits the downlink data to the terminal 120. The terminal 120 and the base station 110 may communicate with each other using the context information of the terminal 120 of the first layer 810 and the second layer 820, and the base station 110 may transmit the downlink data to the terminal 120. Furthermore, after downlink data transmission is completed in operation 1129, the transfer duration may begin as illustrated in FIG. 10, and operation 1017 and operations subsequent thereto may be performed.

As illustrated in FIG. 11B, when a separate layer (e.g., a layer related to the backhaul 1100 or a GTP layer) in which the base station 110 is capable of buffering data exists in addition to the second layer 820, resources for the context information of the terminal 120 of all the PDCP layer, the RLC layer, and the MAC layer may be released in the SAS state. As another example, when a separate layer in which the base station 110 is capable of buffering data does not exist in addition to the second layer 820, the resources for the context information of the terminal 120 of the RLC layer and the MAC layer may be released but the resource for the context information of the terminal 120 of the PDCP layer used for buffering the data may not be released in the SAS state. As another example, when the resources for the context information of the terminal 120 are released, release may be performed in the order of a resource allocated in a lower layer (e.g., in the order of MAC→RLC→PDCP).

According to an embodiment, depending on whether data related to the terminal 120 in the RRC_CONNECTED state is generated, the base station 110 may dynamically allocate a resource for the context information of the terminal 120 in at least one of the PDCP layer, the RLC layer, and the MAC layer, whereby the maximum number of RRC_CONNECTED terminals 120 that the base station 110 is capable of managing in the RRC layer may be increased and hardware resources may be efficiently used. Various embodiments may be applicable to various communication situations. For example, various embodiments may be applied to the situations illustrated in FIGS. 12 and 13, which are described below.

Figure 12:
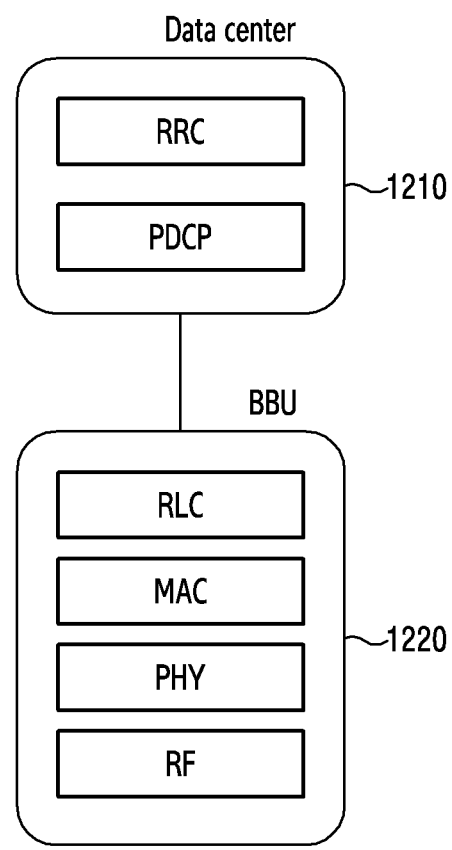
FIG. 12 is a diagram illustrating the layer structure of a data center and a baseband unit (BBU) in a wireless communication system according to an embodiment.

FIG. 12 is a diagram illustrating the layer structure of a data center 1210 and a baseband unit (BBU) 1220 in a wireless communication system according to an embodiment. For example, FIG. 12 illustrates the layer structure of a virtual RAN.

According to an embodiment, the RRC layer and the PDCP layer among the protocol layers of the base station may be managed by the data center 1210, and the RLC layer, the MAC layer, the PHY layer, and the radio frequency (RF) layer may be managed by the BBU 1220. Therefore, resources for terminal context information may be dynamically allocated or released by the BBU 1220. Accordingly, the maximum amount of resources that the data center 1210 allocates to an RRC_CONNECTED terminal may be increased.

Figure 13:
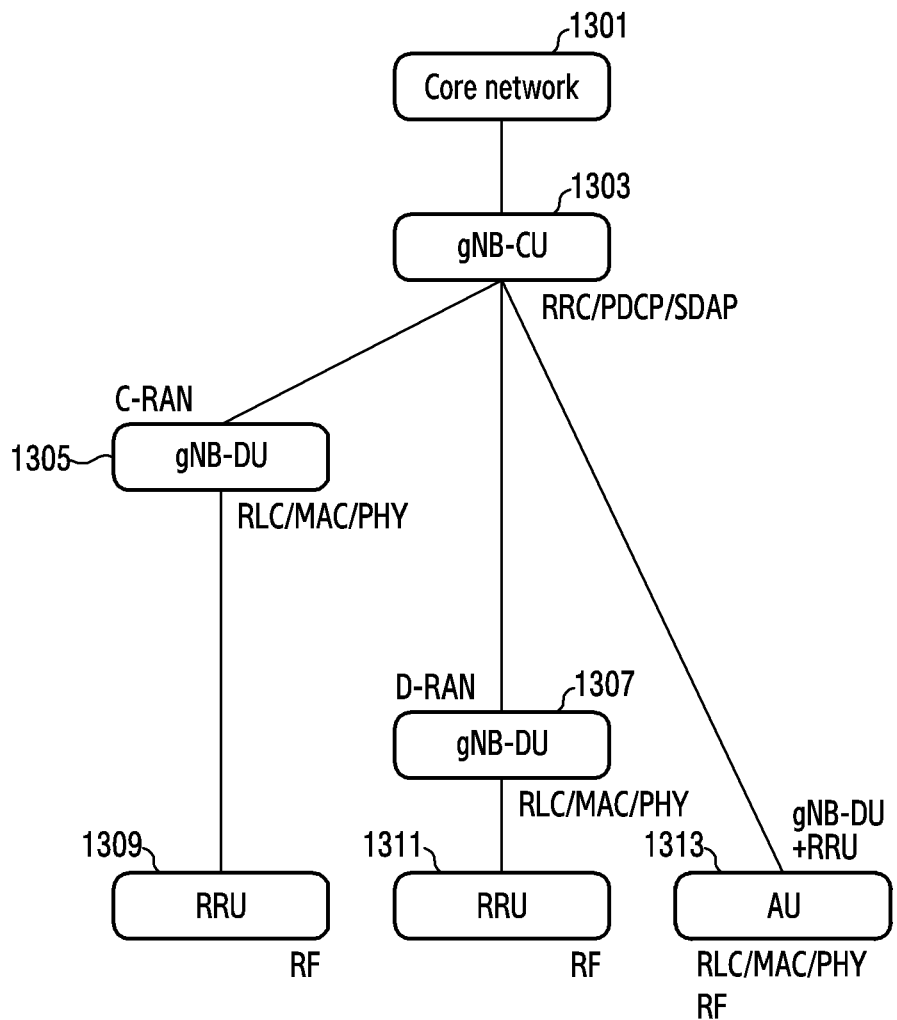
FIG. 13 is a diagram illustrating a layer structure when a central unit (CU) and a distributed unit (DU) are separated in a wireless communication system according to an embodiment.

FIG. 13 is a diagram illustrating a layer structure when a central unit (CU) and a distributed unit (DU) are separated in a wireless communication system according to an embodiment. For example, FIG. 13 illustrates a layer structure based on the function split or allocation of a base station.

Referring to FIG. 13, a gNB-central unit (gNB-CU) 1303 may be connected to a core network 1301, and may be connected to a plurality of gNB-distributed units (gNB-DUs) (e.g., a gNB-DU 305 and a gNB-DU 1307) and an access unit (AU) 1313. The gNB-CU 1303 may manage the RRC layer, the PDCP layer, and a service data adaptation protocol (SDAP) layer among the protocol layers of the base station. Here, the SDAP layer is a layer for managing quality of service (QoS). In the SDAP layer, a QoS flow may be mapped to a data radio bearer (DRB) and a QoS flow identifier may be allocated.

The gNB-DU 1305 and the gNB-DU 1307 may be connected to a remote radio unit (RRU) 1309 and an RRU 1311, respectively. Each of the gNB-DU 1305 and the gNB-DU 1307 may manage the RLC layer, the MAC layer, and the PHY layer. According to an embodiment, the gNB-DU 1305 may be implemented in a centralized RAN (C-RAN) and the gNB-DU 1307 may be implemented in a distributed RAN (D-RAN). Each of the RRU 1309 and the RRU 1311 may manage the RF layer.

The AU 1313 may be a unit or a processing device in which a gNB-DU (e.g., the gNB-DU 1305 or the gNB-DU 1307) and an RRU (e.g., the RRU 1309 or the RRU 1311) are functionally combined. The AU 1313 may manage the RLC layer, the MAC layer, the PHY layer, and the RF layer.

According to an embodiment, resources for the terminal context information may be dynamically allocated or released by a gNB-DU (e.g., the gNB-DU 1305 or the gNB-DU 1307) and/or an AU (e.g., the AU 1313) that manage the RLC layer and the MAC layer. Thus, the maximum amount of resources allocated to an RRC_CONNECTED terminal by a gNB-CU (e.g., the gNB-CU 1303), which manages the RRC layer, may be increased.

In accordance with an aspect of the present disclosure, a non-transitory computer-readable recording medium having recorded thereon a program for performing a method in a computer, wherein the method may include performing data communication with a terminal that is in a first sub-state of a radio connection state, and changing the state of the terminal from the first sub-state to a second sub-state of the radio connection state on the basis of whether data related to the terminal is generated during a transfer duration. Here, the first sub-state is a state in which resources for terminal context information related to the data communication are allocated in a first layer and a second layer, and the second sub-state is a state in which the resource is allocated in the first layer and is released in the second layer.

In accordance with an aspect of the present disclosure, an apparatus for a wireless communication system (e.g., base station 110) may include a memory (e.g., storage unit 230) storing instructions, and at least one processor (e.g., controller 240) configured to execute the instructions to determine to change a state of a terminal, distinct from the apparatus, between a first sub-state of a radio connection state to a second sub-state of the radio connection state, based on whether data related to the terminal is obtained during at least one predetermined duration. Here, the first sub-state is a state in which a resource for context information of the terminal related to the data communication is allocated in a first layer and is allocated in a second layer, and the second sub-state is a state in which the resource is allocated in the first layer, and is released in the second layer.

Methods according to embodiments stated in claims and/or specifications of the present disclosure may be implemented in hardware, software, or a combination of hardware and software.

When the methods are implemented by software, a computer-readable storage medium for storing one or more programs (e.g., software modules) may be provided. The one or more programs stored in the computer-readable storage medium may be configured for execution by one or more processors within the electronic device (e.g., terminal device, base station, etc.). The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device that is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described embodiments, a component may be expressed in the singular form or the plural form according to a presented embodiment. However, the singular form or plural form is selected for convenience of description suitable for the presented situation, and various embodiments are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method of operating a base station in a wireless communication system, the method comprising:
   performing, by the base station, a data communication with a terminal that is in a first sub-state of a radio resource control (RRC) connected state; and
   controlling, by the base station, to change a state of the terminal from the first sub-state to a second sub-state of the RRC connected state, based on whether data related to the terminal is obtained during a transfer duration,
   wherein the first sub-state is a state in which a resource for context information of the terminal related to the data communication is allocated in a first layer and all of a plurality of second layers,
   wherein the second sub-state is a state in which the resource for the context information of the terminal related to the data communication is allocated in the first layer and is released in at least one of the plurality of second layers, and wherein the first layer comprises a RRC layer,
   the plurality of second layers comprises a packet data convergence protocol (PDCP) layer, a radio link control (RLC) layer, and a media access control (MAC) layer, and
   wherein the controlling to change the state of the terminal from the first sub-state to the second sub-state comprises:
      monitoring whether the data related to the terminal is obtained during the transfer duration; and
      based on a determination that the data related to the terminal is not obtained during the transfer duration, controlling to change the state of the terminal from the first sub-state to the second sub-state.

2. The method of claim 1, wherein the context information of the terminal comprises at least one of a bearer identifier for the data communication, a cell-radio network temporary identifier (C-RNTI) of the terminal, an inactivity timer, a packet data unit (PDU) sequence number, or scheduling information associated with the terminal.

3. The method of claim 1, further comprising:
   monitoring whether the data related to the terminal is obtained during a release duration;
   based on a determination that the data related to the terminal is obtained during the release duration, controlling to change the state of the terminal from the second sub-state to the first sub-state; and
   based on a determination that the data related to the terminal is not obtained during the release duration, controlling to change the state of the terminal from the second sub-state to a RRC idle state.

4. The method of claim 3, wherein the controlling to change the state of the terminal from the second sub-state to the first sub-state comprises:
   generating terminal context information for the plurality of second layers, based on terminal context information for the first layer; and
   allocating a resource for the generated terminal context information for the plurality of second layers.

5. The method of claim 4, further comprising:
   receiving a random access request from the terminal and detecting that uplink data is obtained from the terminal;
   transmitting a random access response to the terminal in response to the received random access request; and
   re-establishing a radio connection with the terminal.

6. The method of claim 1, wherein the controlling to change the state comprises identifying the transfer duration in case that a number of radio bearers is greater than a threshold.

7. The method of claim 6, further comprising:
transmitting, to the terminal, a timing alignment (TA) command for releasing a physical uplink control channel (PUCCH) resource allocated to the terminal after receiving a last packet,
wherein the transfer duration is initiated according to a reception of the last packet.

8. The method of claim 7, wherein the transfer duration is shorter than a duration for transferring from the RRC connected state to a RRC idle state.

9. An apparatus of a base station for a wireless communication system, the apparatus comprising:
a transceiver configured to perform data communication with a terminal in a first sub-state of a radio resource control (RRC) connected state; and
at least one processor configured to control to change a state of the terminal from the first sub-state to a second sub-state of the RRC connected state, based on whether data related to the terminal is obtained during a transfer duration,
wherein the first sub-state is a state in which a resource for context information of the terminal related to the data communication is allocated in a first layer and all of a plurality of second layers,
wherein the second sub-state is a state in which the resource for the context information of the terminal related to the data communication is allocated in the first layer, and is released in at least one of the plurality of second layers,
wherein the first layer comprises a RRC layer, and the plurality of second layers comprises a packet data convergence protocol (PDCP) layer, a radio link control (RLC) layer, and a media access control (MAC) layer,
wherein the transceiver is further configured to monitor whether the data related to the terminal is obtained during the transfer duration; and
wherein the at least one processor is further configured to control to change the state of the terminal from the first sub-state to the second sub-state based on a determination that the data related to the terminal is not obtained during the transfer duration.

10. The apparatus of claim 9, wherein the context information of the terminal comprises at least one of a bearer identifier for the data communication, a cell-radio network temporary identifier (C-RNTI) of the terminal, an inactivity timer, a packet data unit (PDU) sequence number, or scheduling information associated with the terminal.

11. The apparatus of claim 9, wherein:
the transceiver is further configured to monitor whether the data related to the terminal is obtained during a release duration; and
the at least one processor is further configured to control to change the state of the terminal from the second sub-state to the first sub-state based on a determination that the data related to the terminal is obtained during the release duration, and to control to change the state of the terminal from the second sub-state to a RRC idle state based on a determination that the data related to the terminal is not obtained during the release duration.

12. The apparatus of claim 11, wherein the at least one processor is further configured to generate terminal context information for the plurality of second layers, based on terminal context information for the first layer, and allocate a resource for the generated terminal context information for the plurality of second layers.

13. The apparatus of claim 12, wherein:
the at least one processor is further configured to receive a random access request from the terminal, and to detect that uplink data is obtained from the terminal; and
the transceiver is further configured to transmit a random access response to the terminal in response to the random access request, and re-establish a radio connection with the terminal.

14. The apparatus of claim 9, wherein the controlling to change the state comprises identifying the transfer duration in case that a number of radio bearers is greater than a threshold.

15. The apparatus of claim 14,
the transceiver is further configured to transmit, to the terminal, a timing alignment (TA) command for releasing a physical uplink control channel (PUCCH) resource allocated to the terminal after receiving a last packet,
wherein the transfer duration is initiated according to a reception of the last packet.

16. The apparatus of claim 15, wherein the transfer duration is shorter than a duration for transferring from the RRC connected state to a RRC idle state.

* * * * *